US011745698B2

(12) United States Patent
Ricke

(10) Patent No.: US 11,745,698 B2
(45) Date of Patent: Sep. 5, 2023

(54) VEHICLE SECURITY SYSTEM

(71) Applicant: WABCO Global GmbH, Bern (CH)

(72) Inventor: Janik Ricke, Uetze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 279 days.

(21) Appl. No.: 17/164,854

(22) Filed: Feb. 2, 2021

(65) Prior Publication Data

US 2021/0245704 A1 Aug. 12, 2021

(30) Foreign Application Priority Data

Feb. 7, 2020 (EP) .................................... 20156176

(51) Int. Cl.
| | |
|---|---|
| *B60R 25/08* | (2006.01) |
| *B60R 25/102* | (2013.01) |
| *B60T 7/00* | (2006.01) |
| *B60W 40/12* | (2012.01) |

(52) U.S. Cl.
CPC ............ *B60R 25/08* (2013.01); *B60R 25/102* (2013.01); *B60T 7/00* (2013.01); *B60W 40/12* (2013.01); *B60T 2260/08* (2013.01); *B60W 2510/30* (2013.01); *B60W 2520/28* (2013.01)

(58) Field of Classification Search
CPC ..... B60R 25/08; B60R 25/102; B60T 13/662; B60T 17/12; B60T 2260/08; B60T 7/00; B60W 2510/30; B60W 2520/28; B60W 40/12

See application file for complete search history.

(56) References Cited

U.S. PATENT DOCUMENTS

| | | | | |
|---|---|---|---|---|
| 7,213,687 B2 * | 5/2007 | Sakai | ........................ | B60T 8/56 188/4 R |
| 7,857,339 B2 * | 12/2010 | Paulson | .................... | B60T 7/22 280/277 |
| 8,655,564 B2 * | 2/2014 | Breuer | ...................... | B60T 7/22 701/70 |
| 9,156,354 B2 | 10/2015 | Rossi et al. | | |
| 9,566,958 B2 * | 2/2017 | Waldmann | ............... | B60T 7/14 |

(Continued)

FOREIGN PATENT DOCUMENTS

| | | |
|---|---|---|
| DE | 102007050221 A1 | 4/2009 |
| DE | 102007052439 A1 | 5/2009 |

(Continued)

*Primary Examiner* — Babar Sarwar
(74) *Attorney, Agent, or Firm* — LEYDIG, VOIT & MAYER, LTD.

(57) ABSTRACT

A vehicle security system is provided for a vehicle having a braking system that includes a parking brake, the parking brake being capable of being switched between a driving position and a braking position. The vehicle security system is configured to secure the vehicle after an accident. The vehicle security system comprises a control unit configured to ascertain an accident of the vehicle and to switch the parking brake of the vehicle into the braking position in response to ascertaining an accident of the vehicle, and a sensor configured to capture and make available first vehicle data that represent a rotary location of the vehicle. The control unit is configured to carry out the ascertainment of an accident on the basis of the first vehicle data.

22 Claims, 11 Drawing Sheets

(56) References Cited

U.S. PATENT DOCUMENTS

| | | | | |
|---|---|---|---|---|
| 2002/0112912 A1* | 8/2002 | Napier | ............... | B60R 21/01 |
| | | | | 180/275 |
| 2003/0090150 A1* | 5/2003 | Woo | ............... | B60T 13/746 |
| | | | | 303/191 |
| 2004/0124697 A1* | 7/2004 | MacGregor | ............ | B60T 17/18 |
| | | | | 180/271 |
| 2005/0046272 A1* | 3/2005 | Rieth | ............... | B60T 7/042 |
| | | | | 303/155 |
| 2006/0197374 A1* | 9/2006 | Jez | ............... | B60T 13/74 |
| | | | | 303/20 |
| 2007/0068746 A1* | 3/2007 | Chittka | ............... | F16D 65/18 |
| | | | | 188/72.6 |
| 2008/0191546 A1* | 8/2008 | Plantamura | ............ | B60T 7/12 |
| | | | | 303/28 |
| 2010/0318256 A1* | 12/2010 | Breuer | ............... | B60T 8/3275 |
| | | | | 701/31.4 |

FOREIGN PATENT DOCUMENTS

| | | |
|---|---|---|
| DE | 102011114072 A1 | 3/2013 |
| EP | 1310412 A1 | 5/2003 |

\* cited by examiner

VEHICLE SECURITY SYSTEM

CROSS-REFERENCE TO PRIOR APPLICATIONS

Priority is claimed to European Patent Application No. EP 20156176.8, filed on Feb. 7, 2020, the entire disclosure of which is hereby incorporated by reference herein.

FIELD

The present disclosure relates to a vehicle security system for a vehicle, in particular a utility vehicle, with a braking system which includes a parking brake, said parking brake being capable of being switched between a driving position and a braking position, and said vehicle security system being designed for securing the vehicle after an accident and exhibiting a control unit which is designed for ascertaining an accident of the vehicle and for switching the parking brake of the vehicle into the braking position if an accident of the vehicle is ascertained. The present disclosure further relates to a method for securing a vehicle and to a vehicle exhibiting a vehicle security system.

BACKGROUND

For the protection of the occupants of a vehicle, in particular a utility vehicle, it is desirable in many cases to brake the vehicle in automated manner. In particular, immediately after an accident it may be helpful to brake the vehicle, in order, for instance, to facilitate a displacement of the vehicle in the event of a further impact or to facilitate a recovery of persons who are casualties of the accident. For rescue forces in the event of accidents there is often the problem that, prior to beginning the rescue of people, the vehicle that has had an accident has to be secured, in order to rule out an additional endangering of the rescue forces. Depending on the loading-state of the vehicle and on the site of the accident, time and a large number of helpers may be needed for this, as a result of which the rescue of persons who are casualties of the accident is delayed. This problem is particularly pronounced in the case of accidents involving several vehicles.

In particular, if utility vehicles—such as trucks, for instance—are involved in the occurrence of the accident, the problem frequently arises that a driver of the utility vehicle has to be recovered from a deformed cab. In many cases, the deployment of hydraulic rescue rams is not sufficient, so a driver's cab of the utility vehicle has to be pulled apart, in which case a prior fixing of the vehicle is indispensable. A further problem may arise in the course of the recovery of overturned trailers or vehicles if the wheels of the vehicle have been set free in the course of righting and the vehicle begins rolling after being set upright. In particular, rescue forces may be endangered if, for the purpose of righting the trailer or vehicle, use is made of further aids—such as a crane or a winch, for instance—which may be dragged along by the vehicle.

Furthermore, above all on heavily-used roads there is the danger that a stationary vehicle will be hit by a further vehicle and pushed into a third vehicle, as a result of which vehicle occupants may become trapped.

Systems are known from the state of the art that are intended to enhance a security of vehicles in advance of or after an accident.

DE 10 2007 052 439 A1 discloses a driver-assistance system for a motor vehicle, with at least one operating-data sensor for capturing operating data characterizing the instantaneous or future state of motion of the motor vehicle and with an electric control system that is designed to trigger an autonomous emergency braking of the motor vehicle when predetermined operating data obtain. Furthermore, there is provision that the electric control system has been set up to bring a parking brake of the motor vehicle into an activation position immediately before, during or after an emergency braking. Furthermore, the electric control system is able to transmit an immobilizing signal if an airbag of the vehicle has been triggered.

DE 10 2011 114 072 B4 discloses a driver-assistance system with a control system that is designed to process driving data captured by a detection device and, when predetermined driving data obtain, to induce a braking device to carry out an autonomous braking of the vehicle. The control system has been designed in such a manner that, also after the autonomous decelerating of the vehicle to the predetermined speed or at a standstill, it keeps the brake device tensioned and/or tensions a further brake device, in order to keep the vehicle in the braked state. By an actuation of a gas pedal, the brake device of the vehicle can be released and the vehicle can be set in motion again under its own power.

DE 10 2007 050 221 A1 also discloses a driver-assistance system for a motor vehicle, which triggers an autonomous emergency braking of the motor vehicle when predetermined driving data obtain. An electric control system has been set up to keep a brake of the motor vehicle in a braking position or to bring it into the braking position after an emergency braking when a vehicle-ahead detection device detects a vehicle ahead.

For the function of the previously known systems, it is necessary that an emergency braking has taken place or an airbag of the vehicle has triggered prior to the accident. If, however, a stationary vehicle is rammed by a further vehicle, the stationary vehicle does not carry out an emergency braking before and/or during the accident, and a corresponding emergency-braking signal is not present. This may be the case, for instance, if a first vehicle pushes a stationary second vehicle into a third vehicle or other obstacle, as a result of which a driver of the second vehicle becomes trapped. This is frequently the case, in particular, in connection with rear-end collisions at ends of a backup. Furthermore, a triggering of the airbag is not ensured in every impact situation. The previously described systems are therefore mostly suitable only for certain accident situations, such as a frontal impact for instance.

SUMMARY

In an embodiment, the present invention provides a vehicle security system for a vehicle having a braking system that includes a parking brake, the parking brake being capable of being switched between a driving position and a braking position. The vehicle security system is configured to secure the vehicle after an accident. The vehicle security system comprises a control unit configured to ascertain an accident of the vehicle and to switch the parking brake of the vehicle into the braking position in response to ascertaining an accident of the vehicle, and a sensor configured to capture and make available first vehicle data that represent a rotary location of the vehicle. The control unit is configured to carry out the ascertainment of an accident on the basis of the first vehicle data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
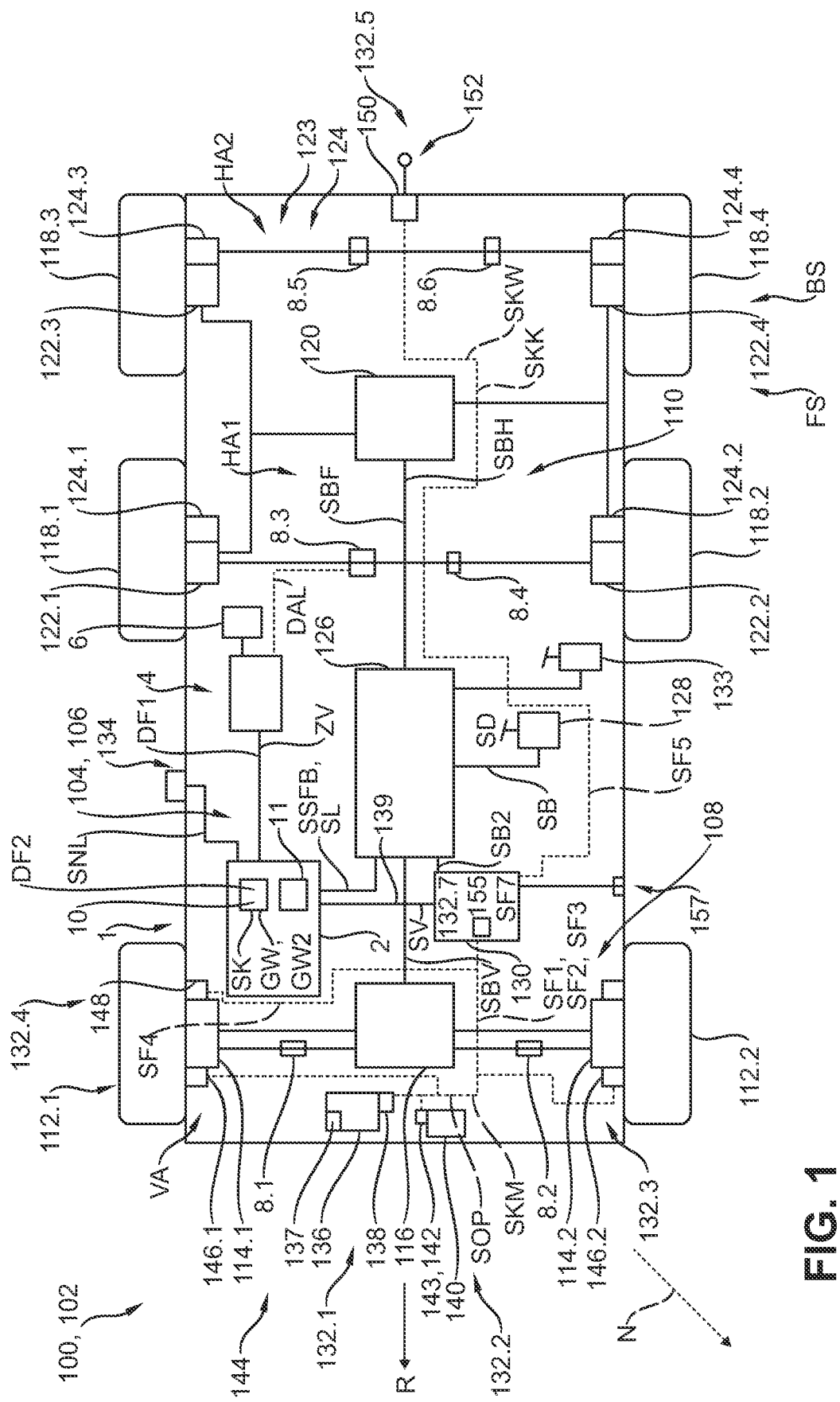
FIG. 1 shows a schematic representation of a vehicle with a vehicle security system according to a first exemplary embodiment.

The present disclosure provides for making available a vehicle security system with an improved functionality in comparison with the state of the art. In particular, a recovery of persons who are casualties of an accident and a securing of the site of the accident are to be facilitated therewith.

The present disclosure provides, in a first aspect, a vehicle security system with a sensor unit for capturing and making available first vehicle data that represent a rotary location of the vehicle, the control unit being designed to carry out the ascertainment of an accident on the basis of the first vehicle data.

The rotary location of the vehicle describes an orientation of the vehicle in space. Changes of the rotary location are brought about by rotational motions and/or tumbling motions of the vehicle. In particular, the rotary location describes a location of the axes of a Cartesian coordinate system, fixed with respect to the vehicle, relative to the coordinate system of the Earth, the coordinate system that is fixed with respect to the vehicle being defined by a vertical axis, a transverse axis and a longitudinal axis of the vehicle. In this connection, the longitudinal axis extends from a rear to a front of the vehicle, and the vertical axis extends from an underbody of the vehicle to a side situated opposite the underbody of the vehicle. The transverse axis extends at a right angle to the vertical axis and to the longitudinal axis. A rotation of the vehicle about its vertical axis is designated as a yawing motion, a rotation about the transverse axis is designated as a pitching motion, and a rotation about the longitudinal axis is designated as a rolling motion. Preferentially, the vehicle data represent an absolute rotary location of the vehicle relative to the coordinate system of the Earth. There may also be provision that the vehicle data represent, in addition to or instead of the absolute rotary location of the vehicle, a change of the rotary location and/or a rate of change of the rotary location of the vehicle.

The control unit is designed to ascertain whether the vehicle has been involved in an accident. The control unit is, for instance, designed to detect whether, in the case of a rear-end collision, the vehicle is stationary and is rammed by a second vehicle. In response to the ascertainment, the control unit switches the parking brake of the vehicle into the braking position. Preferentially, the braking system of the vehicle exhibits parking brakes taking the form of spring-loaded brakes, in which case the control unit is preferentially designed to bleed spring-type actuators of the spring-loaded brakes and consequently to bring the parking brake into the braking position. The ascertainment of an accident—that is to say, the ascertainment of whether the vehicle has been involved in an accident—is carried out by the control unit on the basis of the first vehicle data. Since the first vehicle data represent a rotary location of the vehicle, the ascertainment of an accident is also possible when the vehicle is stationary, no emergency-braking signal and/or no airbag signal was made available. A previously known accident-detection system is accordingly upgraded in advantageous manner with the sensor unit. If the vehicle has, for instance, been involved in a rear-end collision, it executes a pitching motion which can be captured by the sensor unit of the vehicle. The sensor unit thereupon makes available first vehicle data representing the pitching motion of the vehicle. Similarly, the sensor unit is able to capture yawing motions of the vehicle, such as arise, for instance, in the event of a side impact, and/or rolling motions of the vehicle, which arise, for instance, if the vehicle turns over or rolls over, and can make corresponding first vehicle data available. It is to be understood that the vehicle may also be a trailer or exhibit a trailer. Preferentially, the sensor unit is designed to carry out the ascertainment of an accident on the basis of first vehicle data which are made available by an external control unit and/or by an external infrastructure, in particular by a traffic management system.

In a first preferred embodiment, the sensor unit exhibits a rotation-rate sensor which is designed for ascertaining a change of the rotary location of the vehicle about a vertical axis, transverse axis and/or longitudinal axis of the vehicle. However, there may also be provision that the first vehicle data are made available to the sensor unit by a rotation-rate sensor which is designed for ascertaining the change of the rotary location of the vehicle about the vertical axis, transverse axis and/or longitudinal axis of the vehicle. Preferentially, the sensor unit exhibits, in each instance, at least one rotation-rate sensor for ascertaining a change of the rotary location of the vehicle about the vertical axis, transverse axis and longitudinal axis of the vehicle. However, there may also be provision that the rotation-rate sensor is designed for ascertaining changes of the rotary location of the vehicle about more than one of the axes, particularly preferably all the axes. Preferentially, the rotation-rate sensor is designed for ascertaining a rate of change of the rotary location of the vehicle. The rate of change of the rotary location describes a change of angle of at least one of the axes of the vehicle per unit of time. Preferentially, the rotation-rate sensor is designed to make available vehicle data that represent an absolute location of the vehicle. The absolute location of the vehicle describes a location of the vehicle relative to an undersurface on which the vehicle is located. There may also be provision that the control unit is designed to ascertain the absolute location of the vehicle on the basis of the first vehicle data made available by the rotation-rate sensor. For instance, the absolute location specifies whether the vehicle is standing on a slope. Preferentially, the control unit is designed to ascertain whether the vehicle has turned over or rolled over. For this purpose there may be provision that the control unit is designed to detect whether the vehicle is lying on its side and/or on its roof.

Preferentially, the sensor unit exhibits an axle-load sensor which is designed for ascertaining an axle load of axles of the vehicle. Particularly preferably, the axle-load sensor and/or the control unit is/are designed for ascertaining an axle-load distribution of the vehicle. The axle-load distribution is a relative distribution of the mass of the vehicle to the axles thereof. Preferentially, the axle-load distribution may also be a relative distribution of mass to wheels of the vehicle. If the vehicle has been involved in an accident, a location of the center of gravity of the vehicle changes by reason of inertial effects, as a result of which the axle-load distribution or the axle load on the axles and/or wheels of the vehicle is also modified. The axle-load distribution consequently represents a rotary location of the vehicle. The ascertaining of an axle load is also suitable, in particular, for ascertaining accidents in which the airbag of the vehicle does not trigger. If, for instance, a second vehicle drives under the trailer or under a rear of a first vehicle, the axle load of the first vehicle changes, even if an airbag of the first vehicle does not trigger as a result of the rear-end collision with the first vehicle.

Furthermore, an axle-load distribution is suitable for ascertaining an absolute location of the vehicle. If, for instance, the vehicle has turned over, or if the vehicle is lying on its roof, the axles of the vehicle are at least partly relieved, so an absolute location of the vehicle can be ascertained. Furthermore, an arrangement of the vehicle on a gradient can preferentially be ascertained by virtue of the fact that the axle-load distribution has been permanently modified in comparison with an arrangement of the vehicle on a horizontal plane. Preferentially, the sensor unit exhibits at least one axle-load sensor and at least one rotation-rate sensor.

In a preferred further development, the control unit has been adapted to carry out the ascertainment of an accident whilst taking a temporal progression of the vehicle data into account. Preferentially, the control unit exhibits a memory which is designed for storing several items of the first vehicle data. The control unit may have been designed to ascertain the temporal progression of the vehicle data. However, there may also be provision that the sensor unit makes the temporal progression of the vehicle data available. The temporal progression of the vehicle data preferentially comprises several temporally consecutive items of vehicle data. A frequency of provision at which the vehicle data are made available is preferably within a range from 1 Hz to 1000 kHz, preferably 1 Hz to 100 Hz, preferably 1 Hz to 10 kHz, preferably 10 Hz to 100 kHz, preferably 100 Hz to 100 kHz, particularly preferably 100 Hz to 200 Hz.

Preferentially, the control unit is designed to switch, in addition to the parking brake of the vehicle, also a service brake of the vehicle into a braking position in response to the ascertainment of an accident. Consequently a reliable braking of the vehicle can preferentially be ensured even when the parking brake has been damaged by reason of the accident. Moreover, a braking action can be enhanced, as a result of which an improved securing of the vehicle is effected. However, there may also be provision that the control unit is designed to switch only the service brake of the vehicle into the braking position.

Preferably, the control unit is designed to ascertain, on the basis of the vehicle data made available, whether all the wheels of the vehicle are stationary, the control unit being, particularly preferably, designed to engage the parking brake only when all the wheels of the vehicle are stationary. For instance, an engaging of the parking brake of the vehicle can consequently be prevented if the vehicle is in motion. During the trip, an engaging of the parking brake may lead to the locking of the wheels of the vehicle.

In a preferred embodiment, the control unit is designed to carry out the ascertainment of an accident on the basis of the vehicle data and on the basis of a vehicle signal which is made available by a subsystem of the vehicle, preferentially by a wheel-speed sensor, an engine controller, a central main control unit, an oil-pressure sensor, a coolant sensor, a coupling-force sensor, an acceleration sensor, an environment sensor and/or an articulation-angle sensor. The environment sensor is preferentially a camera, an ultrasonic sensor, a radar sensor and/or a lidar sensor.

A subsystem of the vehicle constitutes a functional unit which interacts functionally for the purpose of performing one or more vehicle functions. For instance, a cooling-water system of the vehicle may serve for cooling an engine of the vehicle. The braking system of the vehicle is also a subsystem. It is to be understood that a subsystem of the vehicle may also have been subdivided into further subsystems. For instance, the braking system of the vehicle may exhibit a front-axle brake circuit and a rear-axle brake circuit. Preferentially, the vehicle signals are made available by a central control unit of the vehicle. However, there may also be provision that the subsystems make the vehicle signals directly available. By virtue of the ascertainment of an accident on the basis of vehicle data and on the basis of a vehicle signal, an accuracy, quality and/or speed of the ascertainment can be improved.

Preferentially, the vehicle subsystem is an articulation-angle system which is designed for ascertaining an articulation-angle signal that represents an articulation angle between the vehicle and a trailer coupled onto the vehicle. A side impact may, in particular, cause very rapid changes of the articulation angle. There may also be provision that the ascertainment of an accident is carried out on the basis of several vehicle signals. In this case the vehicle signals may be made available by only one subsystem of the vehicle or by several different subsystems. For instance, a further vehicle signal may represent a steering movement of the vehicle. Vehicle signals that represent a steering movement and an articulation angle can be drawn upon additionally in advantageous manner for the purpose of ascertaining an accident of the vehicle. Preferentially, the control unit may have been designed to ascertain whether a change of the articulation angle is due to a steering movement of the vehicle. It is to be understood that the control unit can carry out the ascertainment of an accident also on the basis of the first vehicle data and on the basis of a plurality of vehicle signals.

Preferentially, the control unit is designed to determine whether the vehicle signal satisfies a predefined signal criterion, and to ascertain an accident of the vehicle only when the vehicle signal satisfies the signal criterion. The signal criterion may be, for instance, an exceeding or falling short of a predefined axle load of a front axle of the vehicle and/or of a predefined rate of change of the articulation angle. The vehicle signal is preferentially a necessary prerequisite for the ascertainment of an accident of the vehicle. The vehicle signal then serves for checking the plausibility of an accident of the vehicle ascertained on the basis of the first vehicle data. If the control unit ascertains an accident, for instance on the basis of the first vehicle data, but the vehicle signal corresponds to a signal that represents the non-occurrence of an accident, the control unit ascertains that no accident obtains. However, there may also be provision that the vehicle signal and the first vehicle data are weighted for the purpose of ascertaining an accident of the vehicle. If, for instance, the first vehicle data represent a particularly rapid and large change of the rotary location of the vehicle, there may be provision that a smaller weighting is given to the vehicle signal when ascertaining an accident. For instance, in the case of particularly large changes and/or rates of change of the rotary location of the vehicle an accident can also be ascertained when the vehicle signal represents the non-occurrence of an accident. Furthermore, there may be provision that a fixed weighting is given to the first vehicle data and to the vehicle signal with respect to the significance thereof when ascertaining an accident. Preferably, a weighting is undertaken using error-rates when ascertaining the first vehicle data and the vehicle signal.

In a preferred embodiment, the vehicle signal is a steering signal, a supply-voltage signal of the vehicle, a wheel-speed signal, an engine signal, an oil-pressure signal, a coolant-level signal, a coupling-force signal, an environment signal of an environment sensor and/or an articulation-angle signal. Preferentially, the control unit is designed to ascertain, on the basis of the steering signal, whether a steering command of a user and/or of a central control unit of the vehicle obtains. Preferably, the control unit is designed to ascertain, on the basis of the steering signal and the first vehicle data, whether a change, represented by the first vehicle data, of the rotary location of the vehicle is being brought about by a steering movement. A wheel-speed signal represents, amongst other things, a motion of the vehicle. Preferentially, the control unit is designed to ascertain, on the basis of the wheel-speed signal, whether the vehicle is stationary. More preferably, the control unit is designed to ascertain, on the basis of the supply-voltage signal, whether a subsystem of the vehicle, in particular an electrical subsystem of the vehicle, has a fault. If, for instance, an electrical subsystem is destroyed in the event of an accident or disconnected from a voltage supply of the vehicle, this may result in a brief change of the supply-voltage signal and consequently point to an accident. The coolant-level signal permits an inference as to whether a cooling circuit of the vehicle has been damaged. For instance, a rapid fall of a coolant level indicates damage to the coolant system, which may be due to an accident. Preferentially, a fall of the coolant level of the vehicle is represented by the coolant-level signal, in which case the control unit is designed for ascertaining the fall of the coolant level.

In a preferred further development, the control unit is designed to bring the parking brake of the vehicle into a driving position in response to a driving signal which is made available by an accelerator pedal of the vehicle and/or in response to an emergency triggering signal which is made available by an emergency triggering device. This may be advantageous if a location of the vehicle has to be modified for the purpose of securing an accident site or for the purpose of recovering persons who are casualties of an accident. Preferentially, the emergency triggering device is arranged on a vehicle exterior. By this means, accessibility by rescue forces can be simplified.

Preferentially, the vehicle security system has been integrated into an electronic braking system of the vehicle. This enables a particularly compact style of construction and/or a reduction of the installation costs. It is to be understood that components of the vehicle security system may, at the same time, also be components of the electronic braking system. For instance, a central control unit of the electronic braking system may also be the control unit of the vehicle security system. Furthermore, the vehicle security system can be supplied by means of a voltage supply of the electronic braking system.

Preferably, the vehicle security system exhibits an emergency-call system which is designed to trigger an emergency call in response to the ascertainment of an accident of the vehicle. By virtue of the triggering of an emergency call, a rescue that is as fast as possible of persons who are casualties of the accident can be ensured. Preferentially, the control unit is designed to drive a communications device of the vehicle for the purpose of triggering the emergency call. However, there may also be provision that the vehicle security system exhibits an emergency-call device which is designed for transmitting emergency-call signals. Particularly preferably, the control unit is designed to ascertain a position of the vehicle and to transmit the position of the vehicle at the time of the triggering of the emergency call.

Preferentially, the control unit is designed to carry out the ascertainment of an accident independently of an emergency-braking signal and/or of an airbag signal of the vehicle. By this means, it is ensured in advantageous manner that an accident of the vehicle is ascertained also when, prior to the accident, no emergency braking of the vehicle was carried out and/or an airbag of the vehicle has not triggered. Preferentially, the emergency call exhibits vehicle-specific information and/or an item of information about a load of the vehicle, in which case the information has particularly preferably been previously stored in a memory of the vehicle security system. By virtue of the vehicle-specific information and/or the load information, rescue forces are enabled to make aids and recovery equipment, matched to the information, available for the recovery.

In another preferred embodiment, the vehicle security system further exhibits a towing attachment which is designed for attaching an external towing apparatus, the control unit being designed to ascertain whether a tensile force is applied to the towing attachment and to bring the parking brake into the braking position if a tensile force is applied. However, there may also be provision that the towing attachment is a purely mechanical towing attachment. Preferentially, the towing attachment is arranged on a driver's cab of the vehicle, in particular under an engine hood of the vehicle.

According to a second aspect, the present disclosure provides a method for securing a vehicle, in particular a utility vehicle, with a vehicle security system in the event of an accident, exhibiting the following steps: capturing vehicle data by means of a sensor unit, making the vehicle data available to a control unit, ascertaining an accident of the vehicle by means of the control unit, using the vehicle data, bringing a parking brake of the vehicle into a braking position by means of the control unit if the control unit ascertains an accident of the vehicle, said vehicle data representing a rotary location of the vehicle. Preferably, the provision of the vehicle data to the control unit is effected by means of a data-bus system of the vehicle. Preferentially, the vehicle data-bus system is a CAN bus system, a LIN bus system, a FlexRay bus system and/or a MOST bus system. In this case there may be provision that the control unit interrogates the vehicle data at the sensor unit, and/or that the sensor unit transmits the vehicle data to the control unit. Preferentially, the vehicle security system is a vehicle security system according to the first aspect.

Preferentially, the step of ascertaining an accident of the vehicle by means of the control unit, using the vehicle data, exhibits: ascertaining a value of a rotational acceleration of the vehicle by means of the control unit on the basis of the first vehicle data, comparing the ascertained rotational acceleration with a predefined limiting value, and determining an accident of the vehicle if the value of the rotational acceleration exceeds the predefined limiting value. By reason of high energies arising, accidents are mostly characterized by particularly high acceleration values. If, for instance, a vehicle rolls over, very high values of an angular acceleration about the transverse axis and/or longitudinal axis of the vehicle arise. Such a high value of the acceleration preferentially lies above a predefined limiting value, so the control unit ascertains that the vehicle has been involved in an accident.

In a preferred further development, the step of ascertaining an accident of the vehicle by means of the control unit, using the vehicle data, exhibits: ascertaining an absolute location of the vehicle by means of the control unit on the basis of the first vehicle data, ascertaining whether the ascertained absolute location of the vehicle is within a predefined set location range of the vehicle, and determining an accident of the vehicle if the ascertained absolute location is not, preferentially for a predefined period, within the set location range of the vehicle. Preferentially, the absolute location is within the predefined set location range if the vehicle is in a regular driving position. Preferably, the vehicle is not within the set location range if the vehicle has turned over and/or if one or more of the wheels of the vehicle is/are not loaded.

Preferentially, the sensor unit exhibits a rotation-rate sensor. The rotation-rate sensor has then preferably been designed for making the first vehicle data available.

Furthermore, the sensor unit preferably exhibits an axle-load sensor. If the sensor unit exhibits an axle-load sensor, the step of ascertaining a value of the rotational acceleration of the vehicle by means of the control unit on the basis of the first vehicle data preferentially exhibits: ascertaining a first axle-load distribution of the vehicle at a first instant, ascertaining a second axle-load distribution of the vehicle at a second instant, ascertaining a change of axle load from the first axle-load distribution and the second axle-load distribution, ascertaining a rate of change of the axle load on the basis of the change of axle load and on the basis of a time-interval that has elapsed from the first instant up until the second instant, and ascertaining a rotational acceleration of the vehicle on the basis of the rate of change of the axle load. It is to be understood that the axle-load distribution may also represent a distribution of load to individual wheels of the vehicle. Furthermore, the sensor unit may also exhibit several axle-load sensors, particularly preferably one axle-load sensor per tire of the vehicle. The axle-load sensor may, for instance, be a pressure sensor arranged in an air-spring bellows of an air-suspension system.

In a preferred further development, the step of ascertaining an absolute location of the vehicle by means of the control unit on the basis of the first vehicle data exhibits: ascertaining an absolute axle load of the vehicle, comparing the absolute axle load of the vehicle with a predefined minimal axle load of the vehicle, ascertaining that the vehicle has turned over if the absolute axle load of the vehicle falls short of the predefined minimal axle load, preferentially for longer than a predefined period. If the vehicle tilts, the axles of the vehicle are relieved for an accident-dependent period or permanently. In this case, there is often even an absence of a loading of the axles by a dead weight of the vehicle. Such a situation is not provided for in a regular operating situation and therefore represents an overturning and/or an accident of the vehicle. Similarly, it is possible—for instance, in the event of a rear impact—that a rear axle of the vehicle is permanently or temporarily loaded or relieved by reason of inertial forces.

According to a preferred embodiment, the method further exhibits: making available vehicle signals of a vehicle subsystem, preferentially of a wheel-speed sensor, an engine controller, a main control unit of the vehicle, an oil-pressure sensor, a coolant sensor, a coupling-force sensor and/or an articulation-angle sensor, comparing the vehicle signal and/or a temporal progression of the vehicle signal with a predetermined signal criterion by means of the control unit, wherein the step of ascertaining an accident of the vehicle by means of the control unit, using the vehicle data, exhibits: ascertaining an accident of the vehicle on the basis of the vehicle data and on the basis of the comparison of the vehicle signal and/or of the temporal progression of the vehicle signal with the predetermined signal criterion. The temporal progression of the vehicle signal preferentially describes a temporal sequence of vehicle signals. Preferentially, the sequence is continuous; however, there may also be provision that the temporal progression of the vehicle signal is a digital temporal progression. Furthermore, the ascertainment of an accident may also be undertaken using data derived from the temporal progression of the vehicle signal.

Preferentially, the switching of the parking brake into the braking position by the control unit occurs only when the vehicle signal and/or the temporal progression of the vehicle signal satisfies/satisfy the predetermined signal criterion. Preferentially, the signal criterion has been satisfied if a predetermined proportion of vehicle signals falls short of or exceeds a predetermined limiting value. Likewise preferably, the signal criterion may have been satisfied if the temporal progression of the vehicle signal exhibits a predefined rate of change. For instance, an intense decrease of an oil-pressure signal of an engine of the vehicle may point to a leakage of an oil-pressure system, which is due to an accident of the vehicle. In a preferred configuration, the signal criterion has been satisfied if the vehicle signal fails to appear. In the event of an accident, subsystems of the vehicle are frequently destroyed, so these subsystems are no longer able to make vehicle signals available. Consequently the non-occurrence of a vehicle signal may point to an accident of the vehicle. Preferentially, the control unit may therefore have been designed to carry out the ascertainment of an accident on the basis of the non-occurrence of a vehicle signal. Preferably, an accident is ascertained only when at least two mutually independent vehicle signals fail to appear. More preferably, the signal criterion may have been satisfied if a central control unit of the vehicle makes a time-out signal available. The central control unit preferentially makes a time-out signal available if a vehicle subsystem is no longer making a signal available. This is particularly desirable if one or more vehicle signals is/are made available to the vehicle security system by means of the central control unit.

In a preferred configuration, the vehicle signal is an engine-speed signal, an oil-pressure signal, a wheel-speed signal, a cooling-water-level signal, an articulation-angle signal, a coupling-force signal, a steering-angle signal, an acceleration signal, an airbag signal and/or a braking signal of the vehicle. Preferentially, the braking signal is an emergency-braking signal. An airbag signal preferably represents a triggering of an airbag of the vehicle. Furthermore, an airbag signal may also be a signal by reason of which an airbag control system gives rise to a triggering of the airbag.

Preferentially, the method further exhibits: actuating an accelerator pedal of the vehicle, making a driving signal available by means of the accelerator pedal in response to the actuating, and releasing the parking brake by means of the control unit if a driving signal is made available.

In a preferred embodiment, the method further exhibits: triggering an emergency call if an accident of the vehicle is ascertained. Particularly preferably, the triggering of an emergency call exhibits a provision of an emergency-call signal to a communications device of the vehicle. More preferably, the triggering of an emergency call exhibits an ascertaining of the position of the vehicle by means of the control unit of the vehicle security system and a transmitting of emergency-call signals that represent a position of the vehicle.

According to a third aspect, the present disclosure provides a vehicle, in particular a utility vehicle, exhibiting a vehicle security system according to the first aspect, which is designed for executing a method according to the second aspect. It is to be understood that the vehicle security system according to the first aspect, the method for securing a vehicle according to the second aspect and also the vehicle according to the third aspect exhibit like or similar subordinate aspects such as have been set down, in particular, in the dependent claims. To this extent, reference is made to the above description in its entirety for these aspects.

A vehicle 100, in particular a utility vehicle 102, exhibits a braking system 104 which here takes the form of an electronically controllable pneumatic braking system 106. Here the braking system 104 exhibits a front-axle brake circuit 108 and a rear-axle brake circuit 110. However, there may also be provision that the vehicle 100 exhibits a combined brake circuit for all the axles of the vehicle 100, two brake circuits for the left and right sides of the vehicle, and/or more than two brake circuits. In particular, the vehicle 100 may also exhibit a trailer brake circuit. For the purpose of braking front wheels 112.1, 112.2 of the vehicle 100, the front-axle brake circuit 108 exhibits front-axle service-brake cylinders 114.1, 114.2 which are driven via a front-axle modulator 116. For the purpose of braking rear wheels 118.1, 118.2, 118.3, 118.4, the rear-axle brake circuit 110 exhibits, in analogous manner, a rear-axle modulator 120 and, connected thereto, rear-axle service-brake cylinders 122.1, 122.2, 122.3, 122.4. The rear-axle service-brake cylinders 122.1, 122.2, 122.3, 122.4 and the front-axle service-brake cylinders 114.1, 114.2 are component parts of a service brake 123 of the vehicle 100. The braking system 104 further includes a parking brake 124 with parking-brake cylinders 124.1, 124.2, 124.3, 124.4 which here have been combined into so-called Tristop cylinders with the rear-axle service-brake cylinders 122.1, 122.2, 122.3, 122.4. However, there may also be provision that the parking-brake cylinders 124.1, 124.2, 124.3, 124.4 have been provided as separate parking-brake cylinders. Furthermore, the parking brake 124 may also have been provided for the purpose of braking front wheels 112.1, 112.2.

The electronically controllable pneumatic braking system 106 further exhibits a central brake control unit 126 which has been provided for the purpose of driving the front-axle brake circuit 108 and the rear-axle brake circuit 110. The central brake control unit 126 is connected to a braking-value generator 128. By actuating the braking-value generator 128, a driver of the vehicle 100 can make a braking specification SB available to the central brake control unit 126 which then makes a front-axle brake signal SBV available to the front-axle brake circuit 108 and a rear-axle brake signal SBH available to the rear-axle brake circuit 110. The service-brake cylinders 114, 122 are then driven by the respective front-axle and rear-axle brake modulators 116, 120, respectively, in accordance with the respectively associated front-axle brake signal SBV and rear-axle brake signal SBH. Furthermore, the central brake control unit 126 is able to drive the front-axle brake circuit 108 and the rear-axle brake circuit 110 also on the basis of an electronic braking specification SB2 which is made available by a main control unit 130 of the vehicle 100. Furthermore, the central brake control unit 126 is designed to make a parking-brake signal SBF available for the parking brake 124. In this exemplary embodiment, the central brake control unit 126 makes the parking-brake signal SBF available to the rear-axle modulator 120 which is designed to drive the parking-brake cylinders 124.1, 124.2, 124.3, 124.4 on the basis of the parking-brake signal SBF.

For the purpose of securing the vehicle 100 after an accident U, the vehicle 100 exhibits a vehicle security system 1. A control unit 2 of the vehicle security system 1 is connected to the central brake control unit 126 and designed for switching the parking brake 124 of the vehicle 100 into a braking position BS. For the purpose of switching the parking brake 124 into the braking position BS, the control unit 2 makes a security parking-brake signal SSFB available to the central brake control unit 126 which is designed to make the parking-brake signal SBF available for the parking brake 124 in response to the provision of the security parking-brake signal SSFB. However, there may also be provision that the control unit 2 is connected to the rear-axle modulator 120 and/or to the parking-brake cylinders 124.1, 124.2, 124.3, 124.4 of the parking brake 124 and makes the security parking-brake signal SSFB directly available to the rear-axle modulator 120 and/or to the parking-brake cylinders 124.1, 124.2, 124.3, 124.4 alongside it.

A sensor unit 4 of the vehicle security system 1 is connected to the control unit 2. The sensor unit 4 is designed to make available first vehicle data DF1 that represent a rotary location LD of the vehicle 100. The sensor unit 4 here exhibits a rotation-rate sensor 6 which is designed for ascertaining a change of the rotary location LD of the vehicle 100 about a vertical axis AH, transverse axis AQ and/or longitudinal axis AL of the vehicle 100 (axes not represented in FIG. 1). Furthermore, the sensor unit 4 exhibits six axle-load sensors 8.1, 8.2, 8.3, 8.4, 8.5, 8.6 which are designed for ascertaining an axle load of the vehicle 100. Here the axle-load sensors 8.1, 8.2, 8.3, 8.4, 8.5, 8.6 are designed to ascertain a respective wheel load on the front wheels 112.1, 112.2 and on the rear wheels 118.1, 118.2, 118.3, 118.4 of the vehicle 100. However, there may also be provision that the axle-load sensors 8.1, 8.2, 8.3, 8.4, 8.5, 8.6 are designed for ascertaining an axle load on the wheels of one axle. It is to be understood that the axle-load sensors 8.1, 8.2, 8.3, 8.4, 8.5, 8.6 and/or the rotation-rate sensor 6 may also have been designed to make data available, and that the control unit 2 is designed to ascertain, on the basis of the data made available, a change of the rotary location LD of the vehicle 100 and/or of an axle load of the vehicle 100. Furthermore, the sensor unit 4 may also exhibit several rotation-rate sensors 6.

Figure 2A:
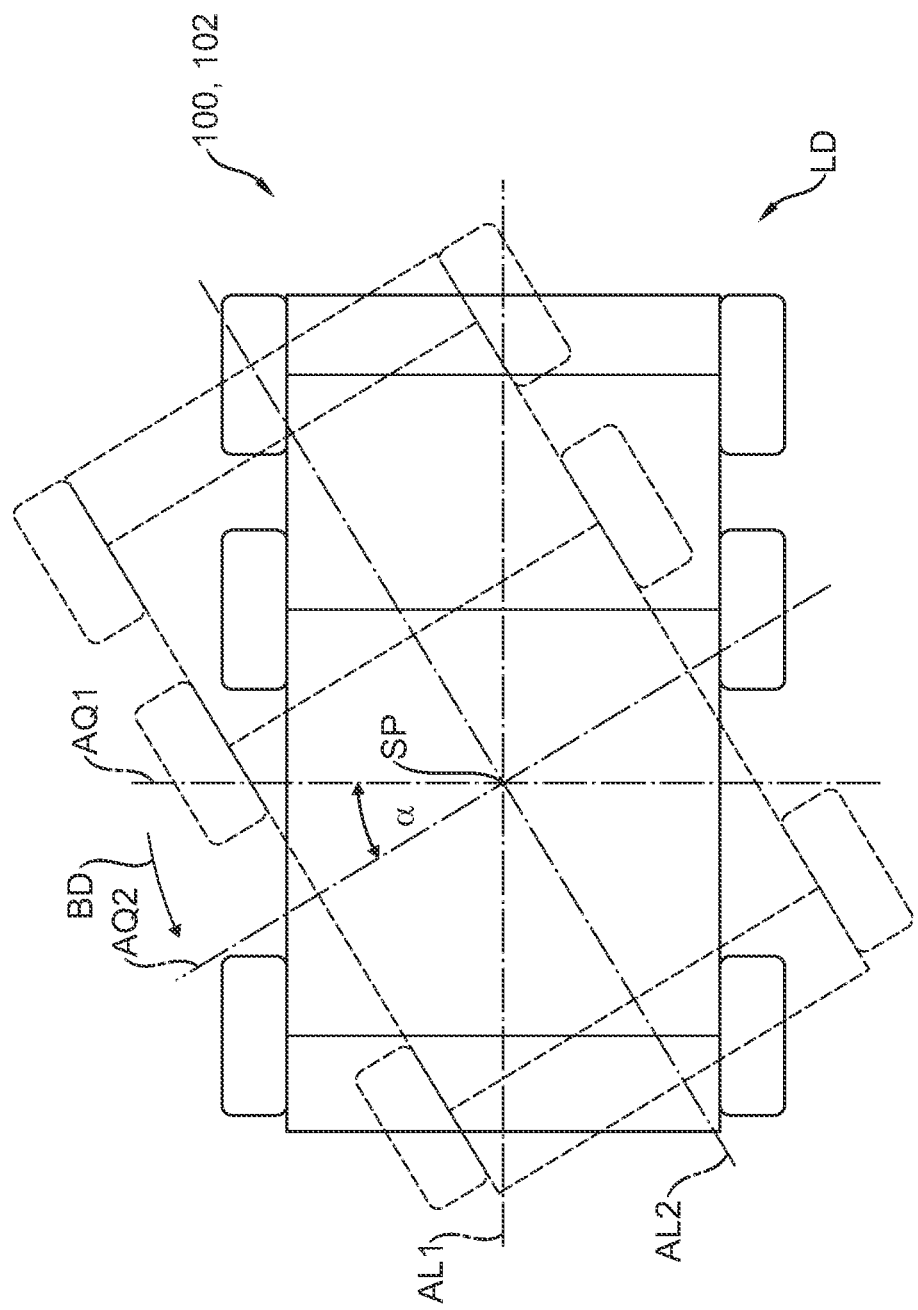
FIG. 2A shows a schematic representation of a yawing motion of the vehicle according to the first exemplary embodiment.
Figure 2B:
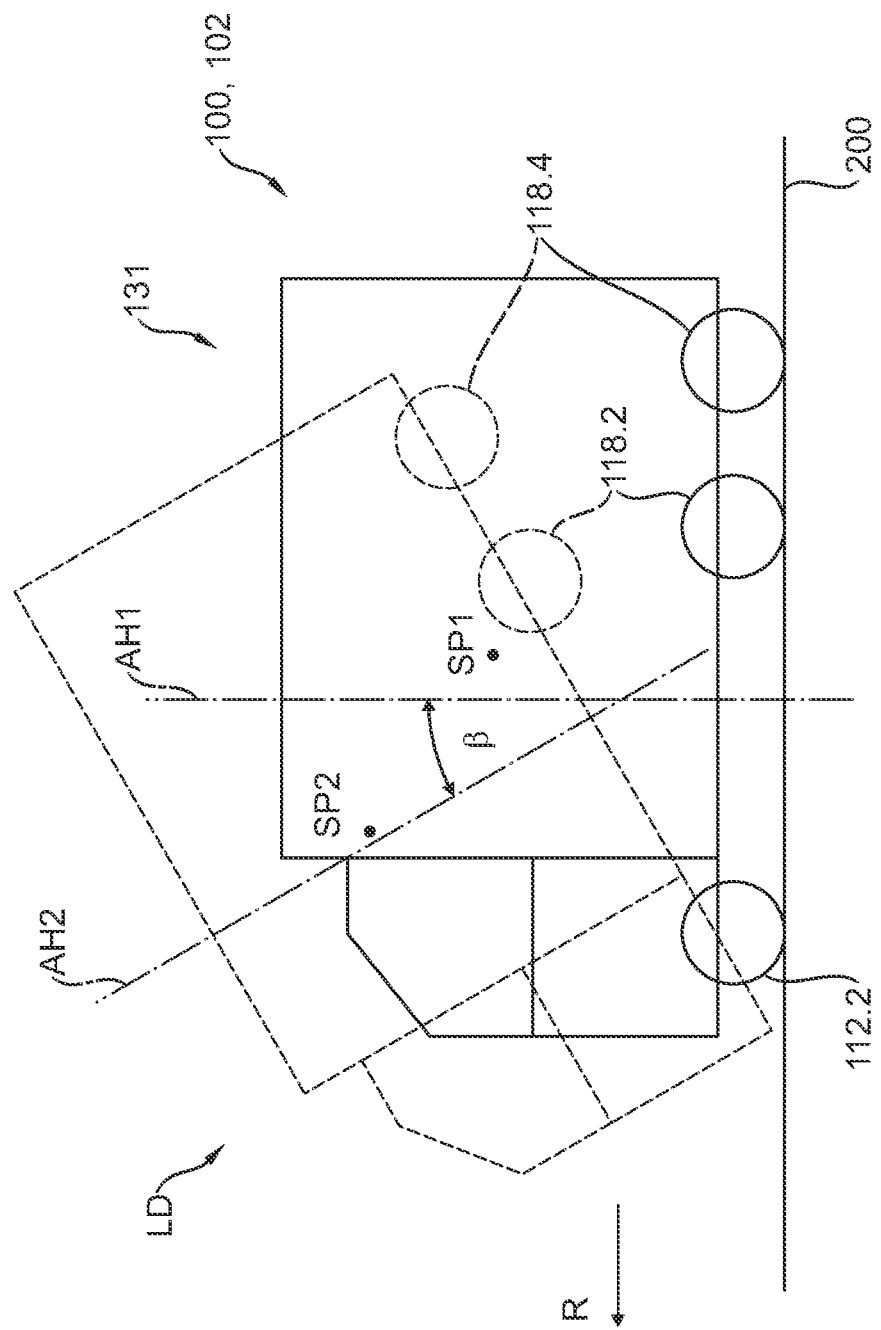
FIG. 2B shows a schematic representation of a pitching motion of the vehicle according to the first exemplary embodiment.
Figure 2C:
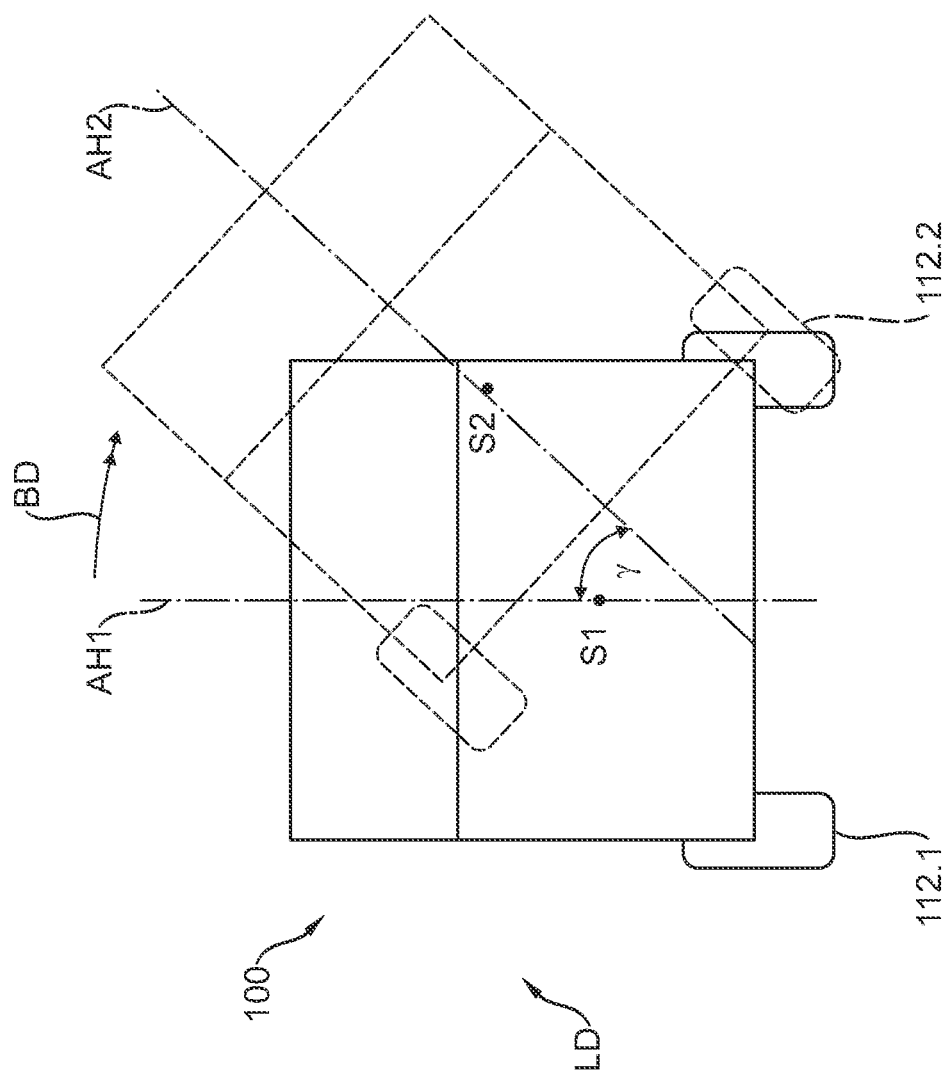
FIG. 2C shows a schematic representation of a rolling motion of the vehicle according to the first exemplary embodiment.

FIGS. 2A-2C show clearly a change of the rotary location LD of the vehicle 100, some components of the vehicle 100 not being represented in FIGS. 2A-2C, for overview reasons. FIG. 2A shows a change of the rotary location LD of the vehicle 100 about the vertical axis AH thereof from an initial position (solid lines) to an end position (dashed lines). In FIG. 2A, the vertical axis AH of the vehicle 100 is pointing out of the image plane. Changes of the rotary location LD of the vehicle 100 about the vertical axis AH are frequently also designated as yawing motions. The yawing motion can be characterized by a yaw angle $\alpha$ which can be measured between a location of the transverse axis AQ1 in the initial position and a location of the transverse axis AQ2 in the end position. In analogous manner, the yaw angle $\alpha$ can also be ascertained between the longitudinal axis AL1 in the initial position and the longitudinal axis AL2 in the end position.

FIG. 2B shows clearly a change of the rotary location LD of the vehicle 100 about the transverse axis AQ thereof, which in FIG. 2B is perpendicular to the image plane. In the initial position (solid lines), the vehicle 100 is standing on an undersurface 200 both with the front wheels 112.1, 112.2 and with the rear wheels 118.1, 118.2, 118.3, 118.4, the vertical axis AH1 of the vehicle 100 being perpendicular to the undersurface 200. In the end position (dashed lines), the rotary location LD of the vehicle 100 has been modified in comparison with the initial position, the change of the rotary location LD being able to be characterized by a pitch angle $\beta$ which is measured between the location of the vertical axis AH1 in the initial position and the location of the vertical axis AH2 in the end position. Furthermore, the pitch angle $\beta$ can also be ascertained between the longitudinal axis in the initial position and the longitudinal axis in the end position (not represented in FIG. 2B). A change of the rotary location LD of the vehicle 100 about the transverse axis AQ thereof is also designated as a pitching motion. In this exemplary embodiment, the rear wheels 118.1, 118.2, 118.3, 118.4 in the end position have been lifted away from the undersurface 200. This is, for instance, briefly possible if the vehicle 100 runs into a protruding obstacle. It is to be understood that a pitching motion is possible also without lifting of wheels 112, 118, for instance by virtue of a partial or complete relief of a suspension system of rear wheels 118.

A rolling motion of the vehicle 100, which corresponds to a change of the rotary location LD of the vehicle 100 about the longitudinal axis AL thereof, is shown by FIG. 2C. The longitudinal axis AL of the vehicle is arranged in FIG. 2C perpendicular to the image plane. The rolling motion is characterized by a roll angle $\gamma$, measured between a vertical axis AH1 in the initial position (solid lines) and a location of the vertical axis AH2 In the end position (dashed lines). The roll angle $\gamma$ may also be ascertained between the transverse axis QA of the vehicle in the initial position and in the end position (not represented in FIG. 2C).

If the vehicle 100 has been involved in an accident U, forces (not represented) act on the vehicle 100 that are not applied at the center of mass SP of the vehicle 100 and cause yawing motions and/or pitching motions and/or rolling motions of the vehicle 100. By virtue of the yawing, pitching and/or rolling motions, the rotary location LD of the vehicle 100 changes. The sensor unit 4 is designed to make available first vehicle data DF1 that represent the rotary location LD of the vehicle 100. Preferentially, the sensor unit 4 is designed to make available first vehicle data DF1 that represent yawing motions, pitching motions and/or rolling motions of the vehicle 100.

The rotation-rate sensor 6 of the sensor unit 4 is preferentially designed to make available data that represent yawing motions, pitching motions and/or rolling motions of the vehicle 100. Preferentially, the rotation-rate sensor 6 of the sensor unit 4 has been arranged for this purpose at a center of gravity SP of the vehicle 100. The rotation-rate sensor 6 may, however, also have been arranged at an arbitrary position in the vehicle 100. Furthermore, there may be provision that the sensor unit 4 exhibits several rotation-rate sensors 6, in which case at least one rotation-rate sensor 6 for the yawing motion, pitching motion and rolling motion of the vehicle 100 has preferentially been provided in each instance. Preferentially, a first rotation-rate sensor 6 may also make available data that represent a motion about two vehicle axes AH, AQ, AL, and a second rotation-rate sensor 6 is designed for making available data that represent a motion about the remaining third vehicle axis.

Particularly preferably, the rotation-rate sensor 6 is designed to ascertain a rate of change of the rotary location LD of the vehicle 100 and/or to make available first vehicle data DF1 that represent a rate of change of the rotary location LD. As a rule, during an accident U particularly strong forces act on the vehicle 100, which result in particularly high rates of change of the rotary location LD. If, for instance, a second vehicle runs into the stationary vehicle 100, vehicle 100 is accelerated jerkily in the direction of travel R. By reason of inertial effects, in this case a pitching motion of the vehicle 100 occurs which results in a particularly high rate of change of the pitch angle $\beta$. In analogous manner, in the event of a side impact, in particular an eccentric side impact, of a vehicle on the stationary vehicle 100 a yawing motion occurs which is characterized by a high rate of change of the yaw angle $\alpha$. Furthermore, a side impact may also cause a rolling motion of the vehicle 100. A roll-over of the vehicle 100 is also characterized by a rolling motion of the vehicle 100 with high rate of change of the roll angle $\gamma$. The rates of change accordingly describe a temporal progression of the vehicle data.

Preferentially, the control unit 2 is also designed to ascertain the rate of change of the yawing motion, pitching motion and rolling motion on the basis of the first vehicle data DF1 made available by the rotation-rate sensor 6. The first vehicle data DF1 then represent a rate of change of the yaw angle $\alpha$, of the pitch angle $\beta$ and/or of the roll angle $\gamma$. For the purpose of ascertaining the yawing motion, pitching motion and/or rolling motion there may be provision that the control unit 4 exhibits a memory 10 which is designed for storing the first vehicle data DF1 representing the rotary location LD of the vehicle 100. The control unit 4 is then designed to ascertain the rate of change of the rotary location LD of the vehicle 100 on the basis of the vehicle data DF1 made available by the sensor unit 6 and/or on the basis of the vehicle data DF1 stored in the memory 10. However, there may also be provision that the rotation-rate sensor 6 is designed to ascertain the rate of change of the rotary location LD of the vehicle 100 and to make it available to the control unit 2.

Preferably, the control unit 2 is designed to ascertain whether a rate of change of the rotary location LD of the vehicle 100 exceeds a predefined limiting value GW which, particularly preferably, has been previously stored in the memory 10. Preferentially, the limiting value GW lies outside a range of values that has been defined by the rates of change of the rotary location LD during accident-free operation of the vehicle 100. If a change, ascertained on the basis of the first vehicle data DF1, of the rotary location LD of the vehicle 100 exceeds the predefined limiting value GW, the control unit 2 ascertains that the vehicle 100 is involved in an accident U. In response to such an ascertainment, the control unit 2 then makes the security parking-brake signal SSFB available to the central brake control unit 126, in order to bring the parking brake 124 of the vehicle 100 into the braking position BS.

The rotation-rate sensor 6 is further designed to make available first vehicle data DF1 that represent an absolute location of the vehicle 100. The control unit 2 is, in addition, designed to ascertain, on the basis of the vehicle data DF1 representing the absolute location of the vehicle 100, whether the vehicle 100 has been involved in an accident U. For instance, after an accident U the vehicle 100 may remain in the end position represented in FIG. 2C by dashed lines. The control unit 2 may then have been designed to ascertain that the end position of the vehicle 100, which constitutes an absolute location, does not correspond to a set location range. The set location range preferentially exhibits a first range of values of the roll angle γ, measured relative to a location of the vertical axis AH that is perpendicular to the undersurface 200, and relative to a current vertical axis AH, from −30° to +30°, preferably −20° to +20°, particularly preferably −10° to +10°. More preferably, the set location range exhibits a second range of values of the pitch angle β, measured relative to a location of the vertical axis AH that is perpendicular to the undersurface 200, and relative to a current vertical axis AH, from −30° to +30°, preferably −20° to +20°, particularly preferably −10° to +10°. The set location range may accordingly exhibit a range of values of the pitch angle β and/or of the roll angle γ. If an ascertained value of the pitch angle β and/or of the roll angle γ of the vehicle 100 does not lie within the respective set location range, an accident U of the vehicle 100 can be ascertained by the control unit 2. Furthermore, the control unit 2 may have been designed to capture a temporal progression of the first vehicle data DF1 and to ascertain, on the basis of the temporal progression of the first vehicle data DF1, whether the vehicle 100 has been involved in an accident U. Particularly preferably, the control unit 2 is designed to ascertain a rate of change of the rotary location LD of the vehicle 100 from the first vehicle data DF1. If, for instance, the rotation-rate sensor 6 makes available, at several consecutive instants, first vehicle data DF1 that represent an absolute rotary location LD of the vehicle 100, the control unit 2 can ascertain the rate of change of the rotary location LD from a comparison of the consecutive items of vehicle data DF1.

According to this exemplary embodiment, the sensor unit 4 of the vehicle security system 1 further exhibits, in addition to the rotation-rate sensor 6, also axle-load sensors 8.1, 8.2, 8.3, 8.4, 8.5, 8.6. However, it is to be understood that the sensor unit 4 may also exhibit only axle-load sensors 8.1, 8.2, 8.3, 8.4, 8.5, 8.6 and/or further sensors. The axle-load sensors 8.1, 8.2, 8.3, 8.4, 8.5, 8.6 are designed to make available first vehicle data DF1 that represent a relative and/or absolute axle load on the front wheels 112.1, 112.2 and on the rear wheels 118.1, 118.2, 118.3, 118.4 of the vehicle 100. However, there may also be provision that the vehicle 100 exhibits fewer than six axle-load sensors 8. Preferably, the sensor unit 4 exhibits in each instance at least one axle-load sensor 8 per axle VA, HA1, HA2 of the vehicle 100. Particularly preferably, the sensor unit 4 exhibits one axle-load sensor 8 per wheel 112.1, 112.2, 118.1, 118.2, 118.3, 118.4 of the vehicle 100. Preferentially, the axle-load sensors 8 may take the form of pressure sensors in air-spring elements of the vehicle 100.

As shown clearly in FIG. 2B, a change of the rotary location LD of the vehicle 100 gives rise to a shift of the center of gravity SP1 of the vehicle 100 from the initial position to a location of the center of gravity SP2 in an end position. By this means, a loading of the axles and wheels 114.1, 114.2, 118.1, 118.2, 118.3, 118.4 of the vehicle 100, which is brought about by the mass of the vehicle 100 and the load of the vehicle 100, also changes. For instance, the front wheels 112.1, 112.2 of the vehicle 100 in the initial position (solid lines) represented in FIG. 2C are loaded uniformly, whereas in the end position (dashed lines) the left front wheel 112.2 is loaded more intensely. By virtue of the pitching motion shown clearly in FIG. 2B, the loaded rear wheels 118.1, 118.2, 118.3, 118.4 of the vehicle 100 in the initial position (solid lines) are lifted away from the undersurface 200, so that these wheels have been completely relieved in the end position (dashed lines). A change of the rotary location LD of the vehicle 100 accordingly gives rise to a change of the axle load, so that vehicle data made available by the axle-load sensors 8.1, 8.2, 8.3, 8.4, 8.5, 8.6 represent the change of the rotary location LD of the vehicle 100.

The control unit 2 can then ascertain, on the basis of the first vehicle data DF1 made available by the axle-load sensors 8.1, 8.2, 8.3, 8.4, 8.5, 8.6, whether the vehicle 100 has been involved in an accident U. In this connection, the control unit 2 may preferentially have been designed to take into account a temporal progression of the change of axle load AALV— that is to say, a rate of change of axle load ALR. In this connection, in particular rapid changes of the axle load, which are characterized by high rates of change of axle load ALR, indicate an accident U of the vehicle 100. However, it is to be understood that the control unit 2 may also have been designed to ascertain an accident U of the vehicle 100 on the basis of slow changes and/or absolute values of the axle load. For instance, the axles VA, HA1, HA2 of the vehicle 100 have been completely relieved if the vehicle 100 has turned over and comes to lie on its roof 131. In regular automotive operation, a complete relief of the axles of the vehicle 100 is not provided for, so the control unit 2 can ascertain an accident U of the vehicle 100 on the basis of the first vehicle data DF1. If the control unit 2 ascertains an accident U of the vehicle 100, it makes the security parking-brake signal SSFB available to the central brake control unit 126.

Preferably, the vehicle security system 1 exhibits an emergency-call system 11 which here has been integrated into the control unit 2. However, there may also be provision that the emergency-call system 11 has been formed separately, or that the emergency-call system 11 is an emergency-call system 11 of the central main control unit 130 of the vehicle 100, said system being driven by the control unit 2. The emergency-call system 11 is designed to trigger an emergency call N if the control unit 2 ascertains an accident U of the vehicle 100 on the basis of the first vehicle data DF1. For instance, the emergency-call system 11 can inform a central rescue control station. Particularly preferably, the emergency-call system 11 is designed to transmit a current position of the vehicle 100.

In certain situations after an accident U it may be necessary to move the vehicle 100. In particular, this may be the case if several vehicles have been jammed together or if an accident site is to be cleared. Movement of the vehicle 100 is prevented by the switching of the parking brake 124.1, 124.2, 124.3, 124.4 into the braking position BS. Therefore the vehicle security system 1 may have been designed to make a triggering signal SL available for the purpose of releasing the parking brakes 124.1, 124.2, 124.3, 124.4. Preferentially, the control unit 2 of the vehicle security system 1 makes the triggering signal SL available if an accelerator pedal 133 of the vehicle 100 is actuated and a driving signal SD is made available. More preferably, the control unit 2 can make the triggering signal SL available if an emergency triggering device 134 makes an emergency triggering signal SNL available. In this exemplary embodiment, the emergency triggering device 134 is a switch fitted on one side of the vehicle 100, which can be easily reached by rescue forces. If the emergency triggering device 134 is actuated, the braking system 104 of the vehicle 100 is brought into a driving position FS. Here, both the braking signal SB and the driving signal SD are made available to the control unit 2 of the vehicle security system 1 by means of the central brake control unit 126. However, there may also be provision that the driving signal SD is made directly available to the control unit 2 by the accelerator pedal 133, or to the control unit 2 by the main control unit 130.

The vehicle 100 here exhibits several vehicle subsystems 132. A first vehicle subsystem 132.1 of the vehicle 100 comprises an engine 136 and an engine sensor 138, preferentially also an engine controller 137. The engine sensor 138 is designed to make available a first vehicle signal SF1 which preferentially may represent an engine speed of the engine 136. The engine sensor 138 is connected to the main control unit 130 of the vehicle 100. The main control unit 130 makes the first vehicle signal SF1 available to the control unit 2 of the vehicle security system 1. For this purpose, the main control unit 130 and the control unit 2 may have been connected by means of a vehicle data bus 139. However, there may also be provision that the engine sensor 138 makes the first vehicle signal SF1 directly available to the control unit 2, or that an engine control unit (not represented) makes the first vehicle signal SF1 available to the control unit 2.

In this exemplary embodiment, the control unit 2 is designed to take into account at least one vehicle signal SF when ascertaining an accident U of the vehicle 100. Preferentially, by virtue of the taking of at least one vehicle signal SF into account, a reliability of the ascertainment of an accident U of the vehicle 100 can be enhanced.

If, for instance, a further vehicle runs into the stationary vehicle 100, the vehicle 100 executes a jerky pitching motion, and the rotation-rate sensor 6 makes available first vehicle data DF1 that represent this pitching motion. The control unit 2 carries out a comparison of the first vehicle data DF1 with a predefined limiting value GW. If, as in the present example, the limiting value GW is exceeded, the control unit 2 ascertains an accident U of the vehicle 100. If the vehicle 100 is strongly accelerated or retarded, the vehicle 100 may carry out jerky pitching motions also in normal automotive operation, so an ascertainment of an accident U of the vehicle 100 solely on the basis of the first vehicle data DF1 may have been made difficult. By virtue of the taking of at least one vehicle signal SF into account, a reliability of the ascertainment of an accident U can be enhanced. For instance, a jerky pitching motion may not be due to a desired acceleration of the vehicle 100 if the first vehicle signal SF1 represents a constant idling speed of the engine 136. Furthermore, after the ascertainment of a jerky pitching motion an engine signal of an engine 136 might fail to appear, as a result of which an accident U of the vehicle 100 might be checked for plausibility.

A second vehicle subsystem 132.2 of the vehicle 100 comprises a radiator 140 and a coolant sensor 142, in particular a coolant-level sensor which makes a coolant signal SKM available. The radiator 140 may, for instance, have been designed for the purpose of cooling the engine 136 of the vehicle 100. The coolant sensor 142 is designed to make available a second vehicle signal SF2 that represents a coolant level of the radiator 140. Preferentially, the coolant takes the form of cooling water, and the coolant sensor 142 takes the form of a cooling-water sensor 143. Analogously to the first vehicle signal SF1, the second vehicle signal SF2 is also made available to the main control unit 130 of the vehicle 100 and made available to the control unit 2 by means of the vehicle data bus 139. However, there may also be provision that the coolant sensor 142 makes the second vehicle signal SF2 directly available to the control unit 2. Radiators 140 of vehicles 100 are generally arranged on a vehicle front 144, as a result of which an effective cooling of the coolant is obtained during a trip of the vehicle 100 in the direction of travel R. By reason of the arrangement on the vehicle front 144, the radiator 140 is frequently damaged if the vehicle 100 has been involved in a frontal impact. By reason of the damage to the radiator 140, coolant can often escape, as a result of which the coolant level of the coolant in the radiator 140 falls.

Preferentially, the control unit 2 is designed to determine whether a vehicle signal SF satisfies a predefined signal criterion SK. For instance, a predefined signal criterion SK may be a falling of the coolant level below a predefined limiting value GW and/or a rate at which the coolant level falls. If a jerky change of the rotary location LD of the vehicle 100 is ascertained, for instance by reason of an accident U, the ascertainment of an accident U by the control unit 2 can be verified if the coolant level falls below a limiting value GW after the ascertainment of the change of the rotary location LD. The control unit 2 is preferably designed to use a falling of a coolant level following a change of the rotary location LD as a criterion for ascertaining an accident U of the vehicle 100. In analogous manner, the ascertainment of an accident U can also be verified by the falling of an engine-oil pressure of the engine 136. For this purpose, the engine sensor 138 is preferentially an oil-pressure sensor 141, in which case the first vehicle signal SF1 made available by the engine sensor 138, which is then an oil-pressure signal SOP, represents an oil pressure of the engine 136. It is to be understood that the vehicle subsystem 132 may also exhibit several sensors which represent different and/or like parameters of the vehicle subsystem 132.

For the purpose of steering, the vehicle 100 exhibits a third vehicle subsystem 132.3. Here, the steering of the vehicle 100 is undertaken by means of adjustment of the front wheels 112.1, 112.2 which define the direction of travel R of the vehicle 100. For the purpose of capturing the current steering position of the vehicle 100, the third vehicle subsystem 132.3 exhibits two steering sensors 146.1, 146.2 which are arranged on the front wheels 112.1, 112.2. However, there may also be provision that the third vehicle subsystem 132.3 exhibits only one steering sensor 146 or more than two steering sensors 146. Furthermore, the steering sensors 146 may also have been arranged at other positions on the third vehicle subsystem 132.3 and/or may capture a steering specification. For instance, the steering sensor 146 is able to capture the steering lock of a steering wheel (not represented). The steering sensors 146.1, 146.2 make available a third vehicle signal SF3 that represents a steering position of the vehicle 100. A third vehicle signal SF3 representing the steering position can be taken into account by the control unit 2 when ascertaining an accident U of the vehicle 100. In this exemplary embodiment, the third vehicle signal SF3 is made available to the control unit 2 for this purpose by means of the vehicle data bus 139. The third vehicle signal SF3 can, for instance, be taken into account in order to ascertain whether a yawing motion of the vehicle 100, ascertained by the control unit 2 on the basis of the vehicle data DF1 made available by the sensor unit 4, was brought about by a steering movement predetermined by a driver. If the control unit 2 ascertains a yawing motion of the vehicle 100 and, taking the third vehicle signal SF3 into account, that no steering movement was carried out, an accident U of the vehicle 100 can be inferred therefrom. Preferentially, if a vehicle signal SF (preferentially the third vehicle signal SF3) represents the non-occurrence of a steering movement of the vehicle 100 and the control unit 2 ascertains a yawing motion of the vehicle 100, this is used as a criterion for ascertaining an accident U of the vehicle 100. Consequently an accuracy of the ascertainment of an accident U of the vehicle 100 is improved.

Preferentially, the vehicle signal SF may represent a fault of a vehicle subsystem 132. Particularly preferably, the control unit 2 is designed to ascertain that a fault of a vehicle subsystem 132 obtains and/or that a vehicle signal SF fails to appear. The non-occurrence of the vehicle signal is frequently also designated as a time out. In consequence of an accident U of the vehicle 100, generally one or more vehicle subsystems 132 are damaged, so vehicle signals SF fail to appear and/or represent a fault of the damaged vehicle subsystem 132. The control unit 2 may therefore preferentially have been designed to use a non-occurrence of one or more vehicle signals SF as a criterion for ascertaining an accident U of the vehicle 100. Preferentially, a vehicle signal SF may also be a supply-voltage signal SV of the vehicle 100. Preferably, the control unit 2 is designed to ascertain, on the basis of a supply voltage of the vehicle 100, whether one or more vehicle subsystems 132 of the vehicle 100 have a fault.

A fourth vehicle subsystem 132.4 may be a wheel-speed sensor 148, in which case a fourth vehicle signal SF4 represents a wheel speed of at least of one wheel 112.1, 112.2, 118.1, 118.2, 118.3, 118.4 of the vehicle 100. Preferentially, the control unit 2 is designed to ascertain, on the basis of the fourth vehicle signal SF4, whether the wheels 112.1, 112.2, 118.1, 118.2, 118.3, 118.4 of the vehicle 100 are stationary. Particularly preferably, the control unit is designed to ascertain an accident U of the vehicle 100 if the first vehicle data DF1 represent a change of the rotary location LD of the vehicle 100 and if a standstill of the wheels 112.1, 112.2, 118.1, 118.2, 118.3, 118.4 of the vehicle 100 is ascertained. If a change of the rotary location LD of the vehicle 100 is ascertained while the wheels 112.1, 112.2, 118.1, 118.2, 118.3, 118.4 of the vehicle 100 are stationary, this points to an accident U of the vehicle 100, since the change of the rotary location LD of the vehicle 100 may not have been brought about by the vehicle 100 itself.

More preferably, the control unit 2 may have been designed to bring the parking brake 124 of the vehicle 100 into a braking position BS only when the wheels 112.1, 112.2, 118.1, 118.2, 118.3, 118.4 of the vehicle 100 are stationary. By virtue of such a preferred configuration, it can be ensured that the parking brake 124 is not engaged during the accident U. By this means, an active intervention of the vehicle security system 1 in the occurrence of the accident is prevented. If the parking brake 124 is engaged while the wheels 112.1, 112.2, 118.1, 118.2, 118.3, 118.4 of the vehicle 100 are revolving, unforeseen disadvantages may be caused. For instance, a state of motion of the vehicle 100 may become unstable, or the vehicle 100 may roll over by reason of locking wheels 112.1, 112.2, 118.1, 118.2, 118.3, 118.4.

A fifth vehicle subsystem 132.5 here is a coupling-force sensor 150. The coupling-force sensor 150 makes available a fifth vehicle signal SF5 that represents a coupling force (not represented). The coupling force is preferentially applied to a trailer coupling 152 of the vehicle. If the vehicle 100 has been involved in an accident U, the fifth vehicle signal SF5 may represent coupling forces at the trailer coupling 152 that do not arise in normal automotive operation. Preferentially, an exceeding of a limiting value GW by the coupling force which is represented by a vehicle signal SF (preferentially the fifth vehicle signal SF5) can be used by the control unit 2 as a criterion for ascertaining an accident U of the vehicle 100. Consequently the ascertainment of an accident U of the vehicle 100 can be improved by virtue of a vehicle signal SF5 made available by the coupling-force sensor 150. If, for instance, the trailer 300 turns over during the accident U, very large coupling forces and/or changes of coupling force arise. Moreover, a change of the rotary location LD of the vehicle 100 may be less strongly pronounced, for instance by reason of damping effects, if a further vehicle collides with the trailer 300. Taking a fifth vehicle signal SF5, which represents the coupling force, into account may therefore improve reliability when ascertaining such accidents. In particular, the fifth vehicle signal SF5, representing the coupling force, and the first vehicle signal SF1, which represents an engine signal of the engine 136, may be used in combination for the purpose of ascertaining an accident U of the vehicle 100. If, for instance, the first vehicle data DF1 represent an intense pitching motion and if the fifth vehicle signal SF5 represents a coupling force, without the first vehicle signal SF1 representing an engine torque of the engine 136, this points to an accident U. A vehicle signal SF representing a coupling force may also be designated as a coupling-force signal SKK.

Figure 3A:
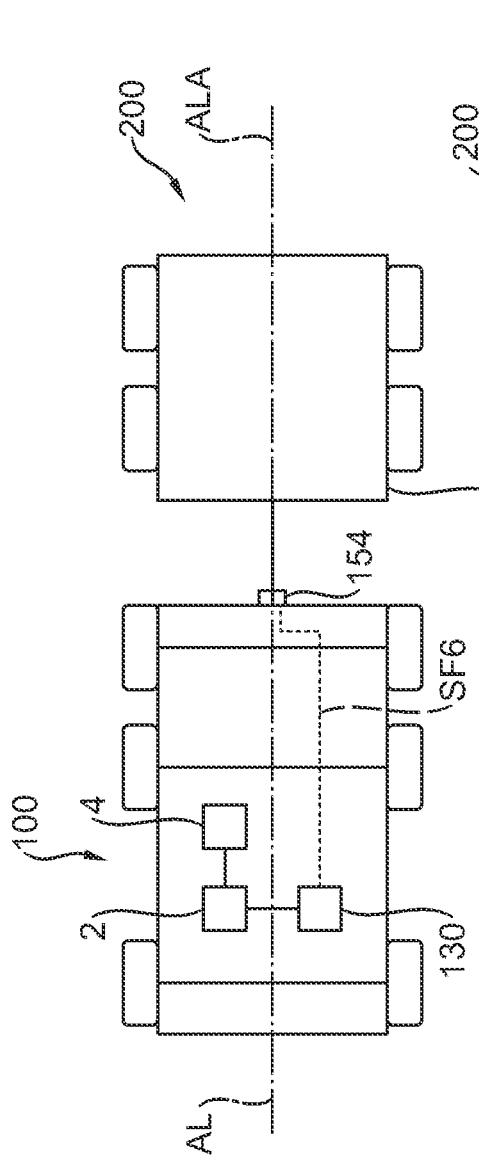
FIG. 3A shows a schematic top view of a vehicle according to the first exemplary embodiment, which is coupled with a trailer.
Figure 3B:
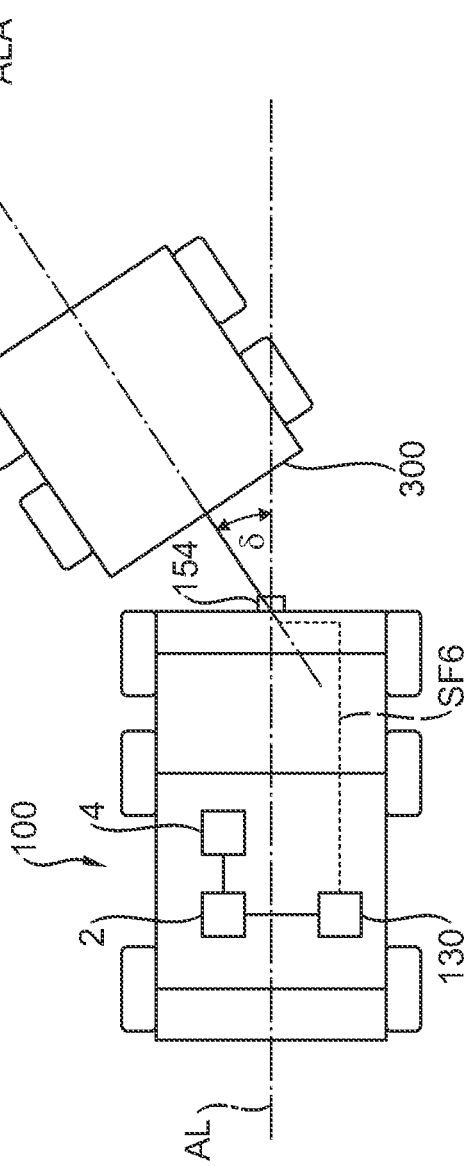
FIG. 3B shows a schematic top view of the vehicle according to FIG. 3A, wherein an articulation angle between trailer and vehicle has been modified with respect to FIG. 3A.

As FIG. 3 makes clear, a sixth vehicle subsystem 132.6 may exhibit an articulation-angle sensor 154 which makes a sixth vehicle signal SF6 available. The sixth vehicle subsystem 132.6 may therefore also be designated as an articulation-angle system. The sixth vehicle signal SF6 preferentially represents an articulation angle δ formed between the longitudinal axis AL of the vehicle 100 and a longitudinal axis ALA of the trailer 300. The control unit 2 is designed to ascertain, taking the articulation angle δ into account, whether the vehicle 100 has been involved in an accident U. Particularly preferably, the ascertainment of an accident U is undertaken whilst taking a rate of change of the articulation angle δ into account. For instance, a side impact of the vehicle 100 and/or of the trailer 300 may result in a very intense change of the articulation angle δ and/or in very high rates of change, over a short time, of the articulation angle δ, which does/do not arise in accident-free automotive operation. A vehicle signal SF representing an articulation angle may also be designated as an articulation-angle signal SKW.

Preferentially, a seventh vehicle subsystem 132.7 exhibits at least one acceleration sensor 155 which makes a seventh vehicle signal SF7 available. Here the acceleration sensor 155 has been integrated into the central main control unit 130. However, there may also be provision that the acceleration sensor 155 has been realized separately and makes the seventh vehicle signal SF7 available. The seventh vehicle signal preferably represents a longitudinal acceleration and/or transverse acceleration of the vehicle 100. Since accidents of the vehicle 100 are also associated with a longitudinal or transverse acceleration of the vehicle 100 in addition to a change of the rotary location LD, the seventh vehicle signal SF7 can be used for the purpose of ascertaining an accident U of the vehicle 100. Furthermore, an eighth vehicle signal SF8 may be the signal of an environment sensor 157. The environment sensor 157 preferentially takes the form of a camera, an ultrasonic sensor, a radar sensor and/or a lidar sensor.

Particularly preferably, the control unit 2 is designed to carry out the ascertainment of an accident U on the basis of the vehicle data DF1 and at least two vehicle signals SF. Preferentially, one of the vehicle signals SF (preferentially the sixth vehicle signal SF6) represents the articulation angle δ, and a further vehicle signal SF (preferentially the third vehicle signal SF3) represents a steering movement of the vehicle 100. Preferentially, if the sixth vehicle signal SF6, which represents the articulation angle δ, exceeds a first limiting value GW and if the third vehicle signal SF3, which represents a steering movement of the vehicle 100, lies below a second limiting value GW2 assigned thereto, this can be used as a criterion for ascertaining an accident U of the vehicle 100. Consequently the ascertainment of an accident U of the vehicle 100 on the basis of the first vehicle data DF1 can be verified in preferred manner by the third vehicle signal SF3 and the sixth vehicle signal SF6. There may also be provision that an accident U of the vehicle 100 is ascertained by the control unit 2 already at lower limiting values GW of the first vehicle data DF1 if the vehicle signal SF satisfies a signal criterion SK. Furthermore, there may be provision that an accident U of the vehicle 100 is ascertained only when at least one vehicle signal SF satisfies a predefined signal criterion SK.

Figure 4:
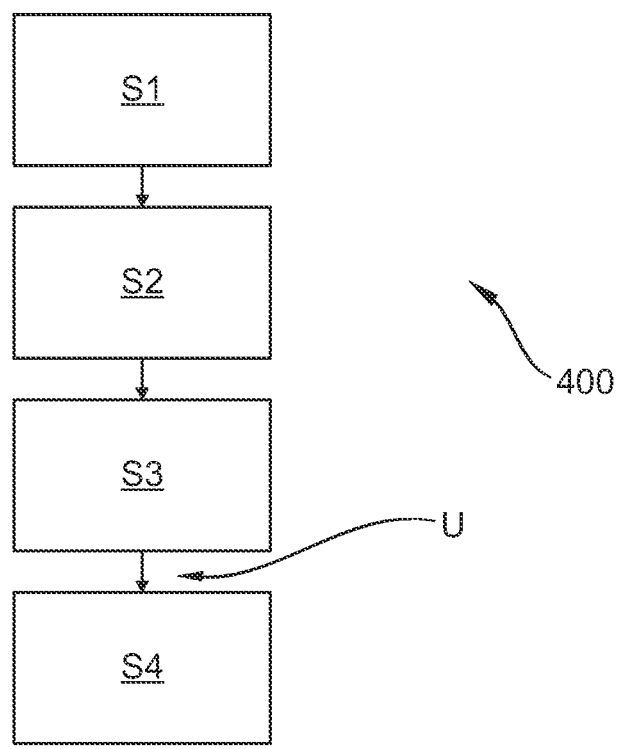
FIG. 4 shows a schematic flowchart for a first embodiment of a method.

FIG. 4 shows clearly a sequence of a preferred embodiment of the method 400 for securing a vehicle 100, in particular a utility vehicle 102, with a vehicle security system 1 in the event of an accident U. In a first step S1, first vehicle data DF1 are captured by means of the sensor unit 4, which then in a step S2 are made available to the control unit 2. Thereupon the control unit 2 ascertains, using the first vehicle data DF1, whether the vehicle 100 has been involved in an accident U (step S3). If the control unit 2 ascertains an accident U of the vehicle 100, the parking brake 24 of the vehicle 100 is brought into a braking position BS by the control unit 2 (step S4). Preferably, for the purpose of bringing the parking brake 24 into the braking position BS the control unit 2 makes the security parking-brake signal SSFB available to the central brake control unit 126 of the braking system 104.

Figure 5:
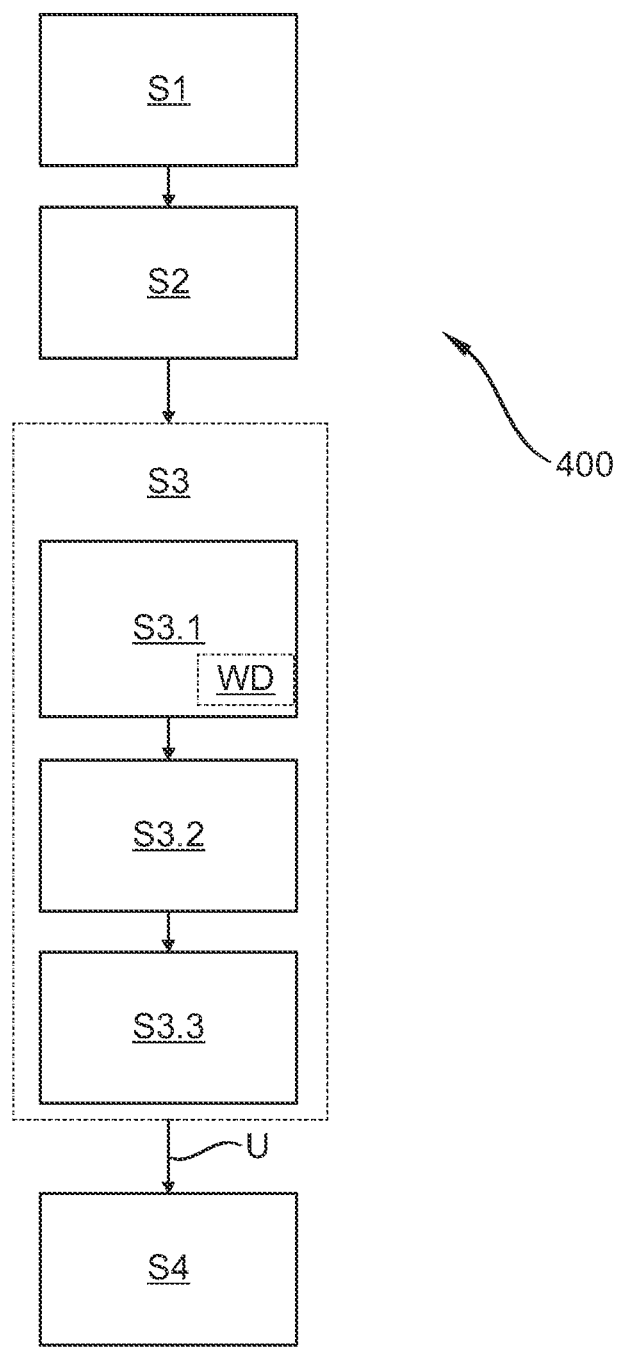
FIG. 5 shows a schematic flowchart of the method according to the first exemplary embodiment with partial steps.

Step S3 may preferentially also exhibit partial steps S3.1, S3.2, S3.3 (FIG. 5). In a first partial step S 3.1, the control unit 2 ascertains, on the basis of the first vehicle data DF1, a value WD of a rotational acceleration BD of the vehicle 100 about its longitudinal axis AL, transverse axis AQ and/or vertical axis AH. In a second partial step S3.2, the ascertained value WD of the rotational acceleration BD is compared with a predefined limiting value GW. Preferentially, the predefined limiting value GW has been previously stored in the memory 10 of the control unit 2. If the value WD of the rotational acceleration BD exceeds the predefined limiting value GW, the control unit 2 determines that the vehicle 100 has been involved in an accident U (partial step S3.3).

Figure 6:
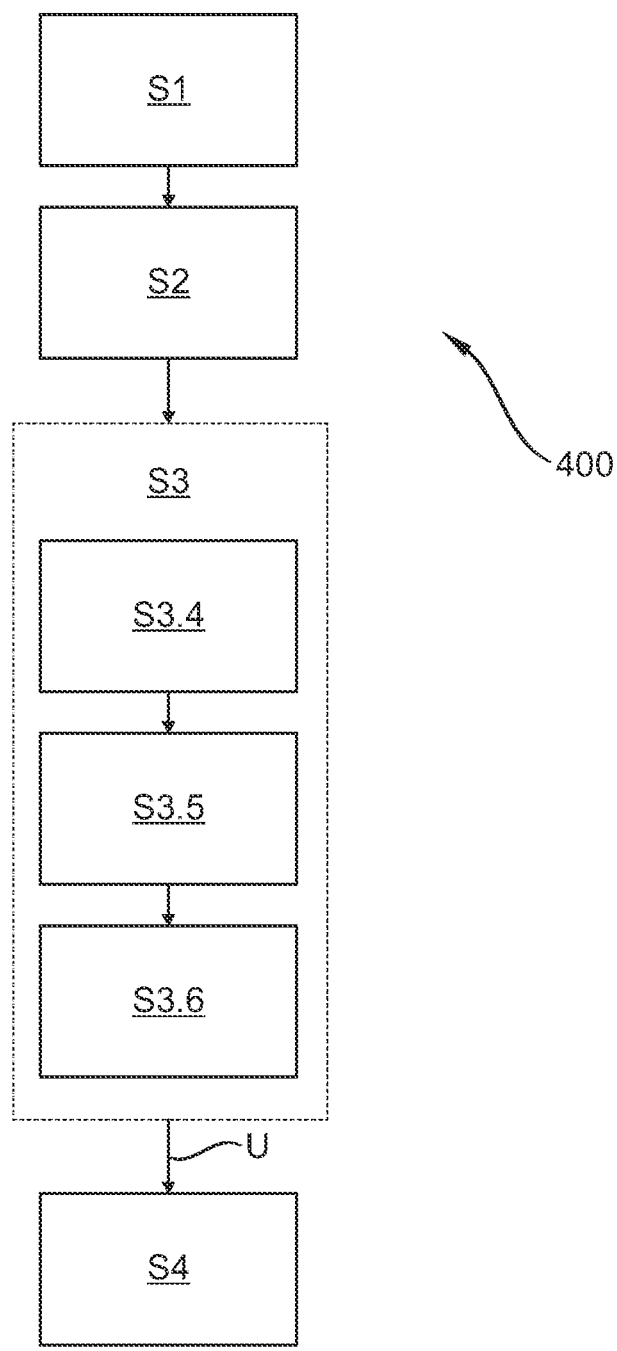
FIG. 6 shows a schematic flowchart for a second preferred exemplary embodiment of the method.

In an alternative or supplementary embodiment of the method 400, step S3 comprises partial steps S3.4, S3.5 and S3.6 (FIG. 6). In a fourth partial step S3.4, the control unit 2 ascertains, on the basis of the first vehicle data DF1, an absolute location of the vehicle 100 with respect to a fixed inertial system. In the fifth partial step S3.5, the control unit 2 thereupon ascertains whether the ascertained absolute location of the vehicle 100 is within a predefined set location range of the vehicle 100. Subsequently the control unit 2 determines an accident U of the vehicle 100 if the location is not within the set location range (partial step S3.6). However, there may also be provision that the control unit 2 ascertains an accident U of the vehicle 100 if the ascertained absolute location of the vehicle 104 is not within the set location range for a predefined period, which preferentially has been previously stored in the memory 10.

Figure 7:
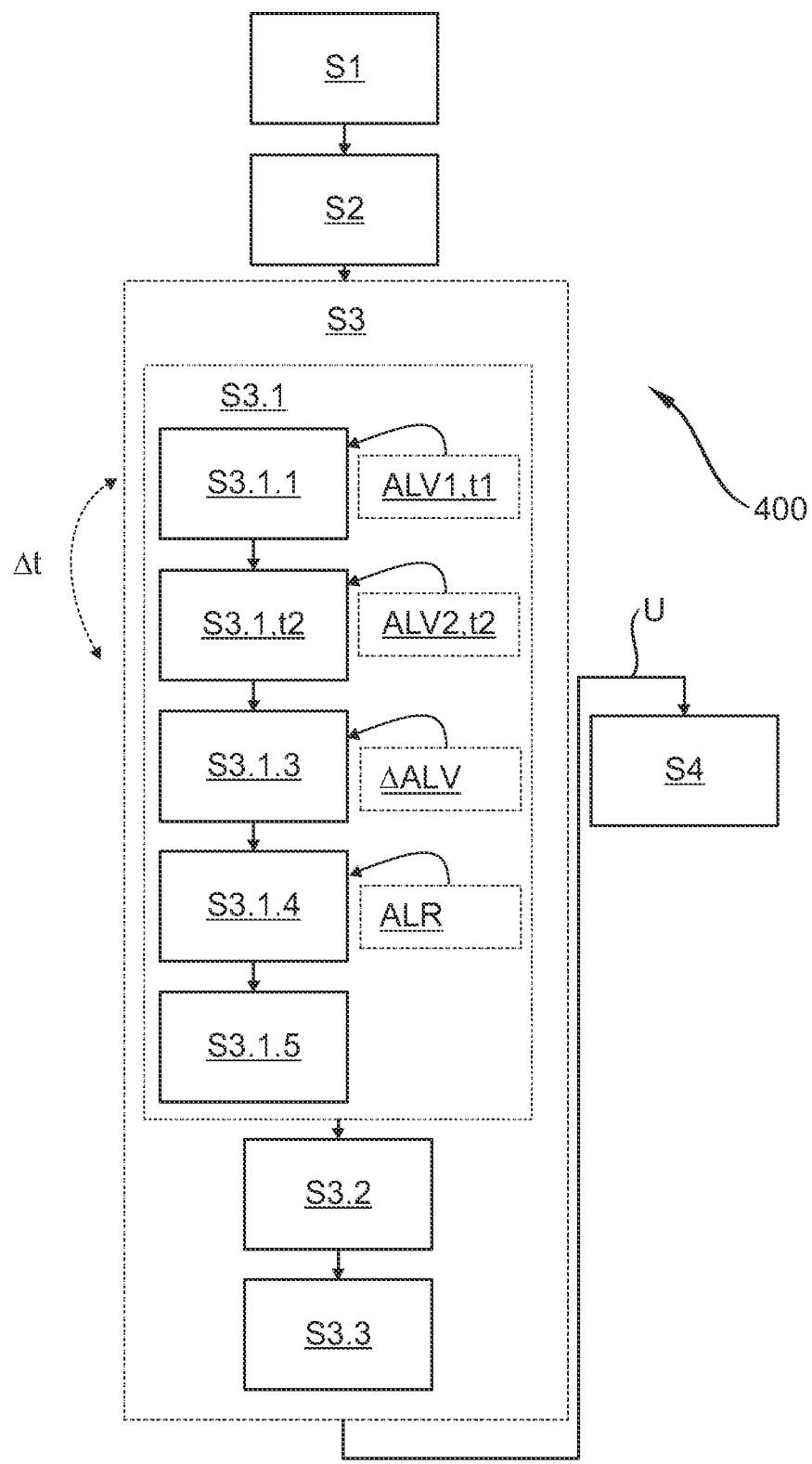
FIG. 7 shows a schematic flowchart of the method according to the first exemplary embodiment with partial steps and substeps.

Again having reference to the first exemplary embodiment of the method 400, partial step S3.1 preferentially exhibits several substeps S3.1.1, S3.1.2, S3.1.3, S3.1.4, S3.1.5 (FIG. 7). Substeps S3.1.1, S3.1.2, S3.1.3, S3.1.4, S3.1.5 describe the ascertainment of a value WD of a rotational acceleration BD of the vehicle 100 by the control unit 2 on the basis of first vehicle data DF1 which are made available by an axle-load sensor 8. The axle-load sensor 8 is preferentially an axle-load sensor 8 of the sensor unit 4. However, there may also be provision that the sensor unit 4 is capable of being connected to an external axle-load sensor 8 for the purpose of receiving axle-load data DAL representing the axle-load distribution ALV of the vehicle 100. In a first substep S 3.1.1, the control unit 2 ascertains, on the basis of the vehicle data DF1 made available by the axle-load sensor 8, a first axle-load distribution ALV1 of the vehicle 100 at a first instant t1. In a second substep S3.1.2, the control unit 2 ascertains, on the basis of the vehicle data DF1 made available by the axle-load sensor 8, a second axle-load distribution ALV2 of the vehicle 100 at a second instant t2. In a third substep S3.1.3, the control unit 2 ascertains a change of axle load AALV from the first axle-load distribution ALV1 at instant t1 and the second axle-load distribution ALV2 at instant t2. After the ascertainment of the change of axle load AALV (S3.1.3), the control unit 2 ascertains the time-interval Δt that has elapsed between the first instant t1 and the second instant t2 and, on the basis of the change of axle load AALV and the time-interval Δt, a rate of change of axle load ALR (substep S3.1.4). In a fifth substep S3.1.5, the control unit 2 then ascertains a rotational acceleration BD of the vehicle 100 on the basis of the rate of change of axle load ALR. Preferably, the ascertainment of the rotational acceleration BD of the vehicle 100 is further undertaken using second vehicle data DF2 previously stored in the memory 10. For instance, the second vehicle data DF2 may be a progression of the signal of the axle-load sensor 8, which has been stored in the memory 10. Furthermore, the second vehicle data DF2 may also be information relating to the vehicle 100, such as, for instance, a vehicle mass, a wheelbase or vehicle dimensions. It is to be understood that the ascertainment of a value of a rotational acceleration BD of the vehicle 100 by the control unit 2 may also be undertaken on the basis of first vehicle data DF1 which are made available by a rotation-rate sensor 6.

Figure 8:
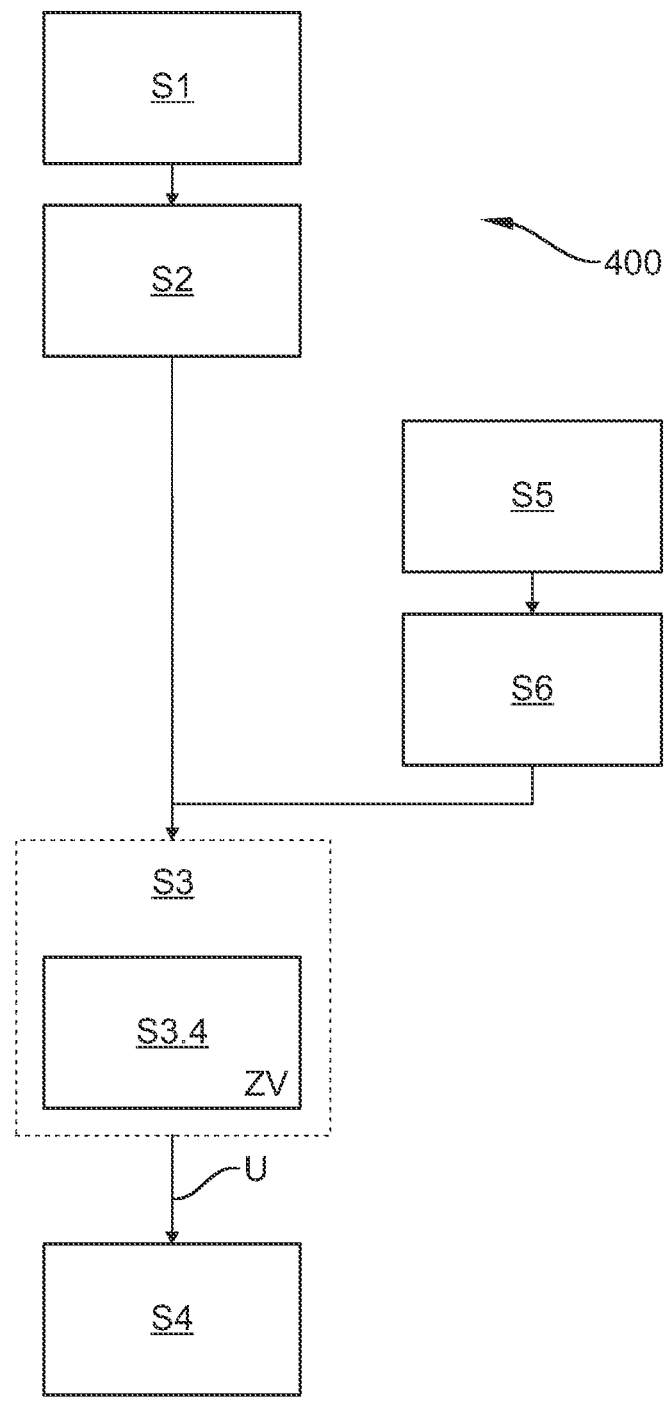
FIG. 8 shows a schematic flowchart for a third preferred exemplary embodiment of the method, which is a further development of the first or second exemplary embodiment.
Figure 9:
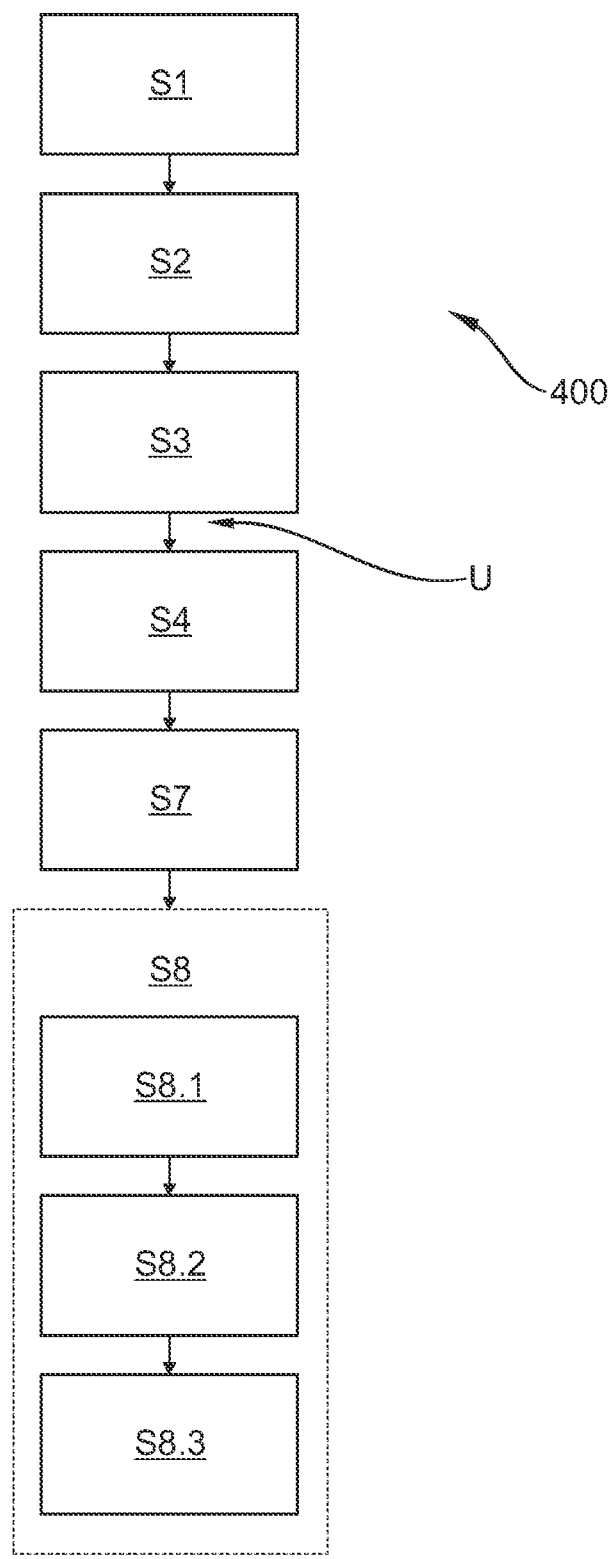
FIG. 9 shows a schematic flowchart for a fourth preferred exemplary embodiment of the method, which is a further development of the first or second exemplary embodiment.

According to the third exemplary embodiment of the method 400 represented in FIG. 8, which is a further development of the first or second exemplary embodiment of the method 400, the method may exhibit further steps S5, S6 which are carried out prior to the ascertainment of an accident U of the vehicle 100 by the control unit 2. In a fifth step S5, which is preferentially carried out in parallel with steps S1 and/or S2, at least one vehicle signal SF of a vehicle subsystem 132 is made available. In a sixth step S6, the control unit 2 compares the vehicle signal SF with a predetermined signal criterion SK. The predetermined signal criterion SK in this case has preferentially been previously stored in the memory 10. In this exemplary embodiment, the step of ascertaining an accident U of the vehicle by means of the control unit 2, using the vehicle data DF1, includes partial step S3.4. In partial step S3.4, the control unit 2 ascertains an accident U of the vehicle 100 both on the basis of the vehicle data DF1 and on the basis of the comparison of the vehicle signal SF1 with the signal criterion SK. Preferentially, partial step S3.4 may also exhibit an ascertainment of an accident U of the vehicle 100 on the basis of the vehicle data DF1 and on the basis of a comparison of the temporal progression of the vehicle signal SF with a predetermined signal criterion SK. It is to be understood that step S3 may, moreover, also exhibit partial steps S3.1 and S3.2.

According to a fourth exemplary embodiment, the method further exhibits steps S7 and S8. In the seventh step S7, an emergency call N is triggered by the vehicle security system 1 if an accident U of the vehicle 100 is ascertained. The eighth step S8 exhibits the enabling steps S8.1, S8.2 and S8.3. In the first enabling step S8.1, the accelerator pedal 133 of the vehicle 100 is actuated. In response to the actuating of the accelerator pedal (S8.1), a driving signal SD is made available. In a third enabling step S8.3, the control unit 2 releases the parking brake 24. Preferentially, for the purpose of releasing the parking brake 24 the control unit 2 makes a triggering signal SL available to the central brake control unit 126. It is to be understood that steps S7 and S8 can be carried out independently of one another. Furthermore, the method according to the third exemplary embodiment may preferentially also exhibit steps S7 and S8.

Preferentially, the control unit 2 is a main control unit 130, a brake control unit 126 and/or a different control unit of the vehicle 100. Furthermore, the control unit 2 may preferentially also be a trailer control unit and/or a trailer brake control unit. Preferably, trailer signals of a trailer 300, which particularly preferably are made available by means of a trailer control unit, may also be used for the purpose of ascertaining an accident U of the vehicle 100. Furthermore, the trailer 300 may also exhibit an emergency triggering device 134. Vehicle signals made available by sensors of the trailer 300 can be used for the purpose of checking the plausibility of, or instead of, the vehicle data. Particularly if, for instance, the towing vehicle is completely destroyed, the trailer 300 can in this way serve as redundancy and engage the brake.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS (PART OF THE DESCRIPTION)

1 vehicle security system
2 control unit
4 sensor unit
6 rotation-rate sensor
8, 8.1, 8.2, 8.3, 8.4, 8.5, 8.6 axle-load sensor
10 Memory
11 emergency-call system
100 Vehicle
102 utility vehicle
104 braking system
106 electronically controllable pneumatic braking system
108 front-axle brake circuit
110 rear-axle brake circuit
112.1, 112.2 front wheels
114, 114.1, 114.2 front-axle service-brake cylinder
116 front-axle modulator
118.1, 118.2, 118.3, 118.4 rear wheels
120 rear-axle modulator
122, 122.1, 122.2, 122.3, 122.4 rear-axle service-brake cylinder
123 service brake
124.1, 124.2, 124.3, 124.4 parking-brake cylinder
124 parking brake
126 central brake control unit
128 braking-value generator
130 main control unit
131 vehicle roof
132, 132.1, 132.2, 132.3, 132.4, 132.5, vehicle subsystems 132.6, 132.7
133 accelerator pedal
134 emergency triggering device
136 Engine
137 engine controller
138 engine sensor
139 vehicle data bus
140 Radiator
141 oil-pressure sensor
142 coolant sensor
143 cooling-water sensor
144 vehicle front
146, 146.1, 146.2 steering sensor
148 wheel-speed sensor
150 coupling-force sensor
152 trailer coupling
154 articulation-angle sensor
155 acceleration sensor
157 environment sensor
200 Undersurface
300 Trailer
400 Method
AH vertical axis of the vehicle
AH1 vertical axis in initial position
AH2 vertical axis in end position AL longitudinal axis of the vehicle
AQ transverse axis of the vehicle
AQ1 transverse axis in initial position
AQ2 transverse axis in end position
ALR rate of change of axle load
ALV1 first axle-load distribution
ALV2 second axle-load distribution
AALV change of axle load
BS braking position
BD rotational acceleration
DAL axle-load data
DF1 first vehicle data
DF2 second vehicle data
FS driving position
GW limiting value
GW2 second limiting value
HA1, HA2 rear axles of the vehicle
LD rotary location
N emergency call
SP center of gravity
SP1 center of gravity of the vehicle in initial position
SP2 center of gravity of the vehicle in end position
SB braking specification
SBF parking-brake signal
SBH rear-axle brake signal
SBV front-axle brake signal
SF, SF1, SF2, SF3, SF4, SF5, SF6, SF7, vehicle signal
SF8
SK signal criterion
SKK coupling-force signal
SKM coolant signal
SKW articulation-angle signal
SNL emergency triggering signal
SOP oil-pressure signal
SSFB security parking-brake signal
SV supply-voltage signal
t1 first instant
t2 second instant
At time-interval
U Accident
VA front axle of the vehicle
WD value of the rotational acceleration
ZV temporal progression
A yaw angle
B pitch angle
Γ roll angle
Δ articulation angle

What is claimed is:

1. A vehicle security system for a vehicle having a braking system that includes a parking brake, the parking brake being capable of being switched between a driving position and a braking position,
the vehicle security system being configured to secure the vehicle after an accident and comprising:
a control unit configured to ascertain an accident of the vehicle and to switch the parking brake of the vehicle into the braking position in response to ascertaining an accident of the vehicle, and
a sensor configured to capture and make available first vehicle data that represent a rotary location of the vehicle,
wherein the control unit is configured to carry out the ascertainment of an accident on the basis of the first vehicle data.

2. The vehicle security system as claimed in claim 1, wherein the sensor includes a rotation-rate sensor configured to ascertain a change of the rotary location of the vehicle about a vertical axis, transverse axis and/or longitudinal axis of the vehicle.

3. The vehicle security system as claimed in claim 1, wherein the sensor includes an axle-load sensor configured to ascertain an axle load of axles of the vehicle.

4. The vehicle security system as claimed in claim 1, wherein the control unit is configured to carry out the ascertainment of an accident whilst taking a temporal progression of the first vehicle data into account.

5. The vehicle security system as claimed in claim 1, wherein the control unit is configured to switch, in addition to the parking brake of the vehicle, also a service brake of the vehicle into a braking position in response to the ascertainment of an accident.

6. The vehicle security system as claimed in claim 1 wherein the control unit is configured to carry out the ascertainment of an accident on the basis of the first vehicle data and at least one vehicle signal which is made available by a vehicle subsystem of the vehicle, the vehicle subsystem including one or more of a wheel-speed sensor, an engine controller, a central main control unit, an oil-pressure sensor, a coolant sensor, a coupling-force sensor, one or more acceleration sensors, one or more environment sensors, and/or an articulation-angle sensor.

7. The vehicle security system as claimed in claim 6, wherein the control unit is configured to determine whether the vehicle signal satisfies a predefined signal criterion and to ascertain an accident of the vehicle only when the vehicle signal satisfies the predefined signal criterion.

8. The vehicle security system as claimed in claim 7, wherein the vehicle signal is a steering signal, a supply-voltage signal of the vehicle, a wheel-speed signal, an engine signal, an oil-pressure signal, a coolant signal, a coupling-force signal, and/or an articulation-angle signal.

9. The vehicle security system as claimed in claim 1, wherein the control unit is configured to bring the parking brake of the vehicle into a driving position in response to a driving signal which is made available by an accelerator pedal of the vehicle and/or in response to an emergency triggering signal which is made available by an emergency triggering device.

10. The vehicle security system as claimed in claim 1, further comprising an emergency-call system configured to trigger an emergency call in response to the ascertainment of an accident of the vehicle.

11. The vehicle security system as claimed in claim 10, wherein the emergency call includes vehicle-specific information and/or an item of information about a load of the vehicle, which has been previously stored in a memory of the vehicle security system.

12. The vehicle security system as claimed in claim 1, wherein the control unit is configured to carry out the ascertainment of an accident independently of an emergency-braking signal and/or an airbag signal of the vehicle.

13. A method for securing a vehicle with a vehicle security system in an event of an accident, the method comprising:
capturing vehicle data by a sensor unit,
making the vehicle data available to a control unit,
ascertaining, using the vehicle data, an accident of the vehicle by the control unit, and
bringing, by the control unit, a parking brake of the vehicle into a braking position in response to the control unit ascertaining the accident of the vehicle,
wherein the vehicle data represents a rotary location of the vehicle.

14. The method as claimed in claim 13, wherein the sensor unit exhibits an axle-load sensor and/or is capable of being connected to an axle-load sensor of the vehicle.

15. The method as claimed in claim 13, further comprising:
making available a vehicle signal of a vehicle subsystem, the vehicle subsystem including one or more of a wheel-speed sensor, an engine controller, a main control unit of the vehicle, an oil-pressure sensor, a coolant sensor, a coupling-force sensor, one or more acceleration sensors, one or more environment sensors, and/or an articulation-angle sensor,
comparing, by the control unit, the vehicle signal and/or a temporal progression of the vehicle signal with a predetermined signal criterion,
wherein the ascertaining an accident of the vehicle by the control unit, using the vehicle data, includes:
ascertaining an accident of the vehicle based on the vehicle data and based on the comparison of the vehicle signal and/or of the temporal progression of the vehicle signal with the predetermined signal criterion.

16. The method as claimed in claim 15, wherein the switching of the parking brake into the braking position by the control unit is undertaken in response to the vehicle signal and/or the temporal progression of the vehicle signal satisfying the predetermined signal criterion.

17. The method as claimed in claim 13, further comprising:
actuating an accelerator pedal or an emergency triggering device of the vehicle,
making a driving signal available by the accelerator pedal or the emergency triggering device in response to the actuating, and
releasing the parking brake by the control unit if a driving signal is made available.

18. The method as claimed in claim 13, further comprising:
triggering an emergency call if an accident of the vehicle is ascertained.

19. The method as claimed in claim 13, wherein the sensor unit exhibits a rotation-rate sensor.

20. The method as claimed in claim 13, wherein the ascertaining of an accident of the vehicle includes:
ascertaining a value of a rotational acceleration of the vehicle about a vertical axis, transverse axis and/or longitudinal axis by the control unit based on the vehicle data,
comparing the ascertained rotational acceleration with a predefined limiting value, and
determining an accident of the vehicle in response to the value of the rotational acceleration exceeding the predefined limiting value.

21. The method as claimed claim 20, wherein the step of ascertaining a value of a rotational acceleration of the vehicle by the control unit based on the vehicle data includes:
ascertaining a first axle-load distribution of the vehicle at a first instant,
ascertaining a second axle-load distribution of the vehicle at a second instant,
ascertaining a change of axle load from the difference of the first axle-load distribution and the second axle-load distribution,
ascertaining a rate of change of axle load based on the change of axle load and based on a time-interval that has elapsed from the first instant up until the second instant, and
ascertaining a rotational acceleration about a vertical axis, transverse axis and/or longitudinal axis of the vehicle based on the rate of change of axle load.

22. A vehicle, comprising a vehicle security system as claimed in claim 1.

* * * * *